United States Patent
Mohan et al.

(10) Patent No.: US 11,652,709 B2
(45) Date of Patent: May 16, 2023

(54) MANAGING COMPUTATION LOAD IN A FOG NETWORK

(71) Applicant: Telefonaktiebolaget LM Ericsson (publ), Stockholm (SE)

(72) Inventors: Saravanan Mohan, Chennai (IN); Arindam Banerjee, Howrah (IN); Perepu Satheesh Kumar, Chennai (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 29 days.

(21) Appl. No.: 17/291,123

(22) PCT Filed: Nov. 9, 2018

(86) PCT No.: PCT/IN2018/050729
§ 371 (c)(1),
(2) Date: May 4, 2021

(87) PCT Pub. No.: WO2020/095313
PCT Pub. Date: May 14, 2020

(65) Prior Publication Data
US 2021/0392055 A1    Dec. 16, 2021

(51) Int. Cl.
*H04L 41/5009* (2022.01)
*H04L 41/12* (2022.01)
(Continued)

(52) U.S. Cl.
CPC .......... *H04L 41/5012* (2013.01); *H04L 41/12* (2013.01); *H04L 41/142* (2013.01);
(Continued)

(58) Field of Classification Search
None
See application file for complete search history.

(56) References Cited

U.S. PATENT DOCUMENTS

| 9,077,478 B1* | 7/2015 | Schmidtke | .......... H04J 14/0257 |
| 2004/0076164 A1* | 4/2004 | Vanderveen | .......... H04W 40/18 |
| | | | 370/400 |

(Continued)

FOREIGN PATENT DOCUMENTS

CN     107343025 A     11/2017

OTHER PUBLICATIONS

Latham et al. "Mutual Information," Posted at www.scholarpedia.org/article/Mutual_information in 2009 (Year: 2009).*

(Continued)

*Primary Examiner* — Scott B Christensen
(74) *Attorney, Agent, or Firm* — Sage Patent Group

(57) ABSTRACT

A method for managing computation load of a fog node is disclosed, wherein a computation capacity of the fog node is predicted to become unavailable to a fog network. The method comprises identifying a candidate set of nodes for computational load transfer from the fog node. The method further comprises obtaining a computation graph representing computation in the fog network, and using a learning model to identify a morphism from the obtained computation graph to a new computation graph, in which the fog node is not included. The identified morphism comprises a sequence of one or more morphing operations that replaces the fog node in the obtained computation graph with a topology of one or more nodes selected from the candidate set. The method further comprises causing computation performed at the fog node to be transferred to one or more nodes of the candidate set.

22 Claims, 12 Drawing Sheets

(51) Int. Cl.
  *H04L 41/142* (2022.01)
  *H04L 41/147* (2022.01)
  *H04L 43/0805* (2022.01)
  *H04L 43/16* (2022.01)
  *H04L 67/1008* (2022.01)
  *G06N 20/00* (2019.01)

(52) U.S. Cl.
  CPC ........ *H04L 41/147* (2013.01); *H04L 43/0805* (2013.01); *H04L 43/16* (2013.01); *H04L 67/1008* (2013.01); *G06N 20/00* (2019.01)

(56) References Cited

U.S. PATENT DOCUMENTS

2015/0143184 A1* 5/2015 Suzuki ................ H04L 41/0659
  714/48
2018/0063020 A1* 3/2018 Bhagavatula ........... H04L 47/80
2018/0196139 A1* 7/2018 Brown .................... G01S 17/10
2020/0296789 A1* 9/2020 Wang .................. H04W 64/006

OTHER PUBLICATIONS

International Search Report and Written Opinion of the International Searching Authority, PCT/IN2018/050729, dated Feb. 21, 2019, 8 pages.

Jijin, Jofina et al., "Service Load Balancing in Fog-Based 5G Radio Access Networks", IEEE, Auckland University of Technology, 2017, Auckland, New Zealand, 5 pages.

Shakibian, Hadi, et al., "Mutual Information Model for Link Prediction in Heterogeneous Complex Networks", Scientific Reports, Mar. 27, 2017, 16 pages.

Quinn, C.J. et al., "Directed Information Graphs", IEEE, Mar. 11, 2015, 41 pages.

* cited by examiner

MANAGING COMPUTATION LOAD IN A FOG NETWORK

CROSS REFERENCE TO RELATED APPLICATIONS

This application is a 35 U.S.C. § 371 national stage application of PCT International Application No. PCT/IN2018/050729 filed on Nov. 9, 2018, the disclosure and content of which is incorporated by reference herein in its entirety.

TECHNICAL FIELD

The present disclosure relates to a method for managing computation load of a fog node belonging to a fog network. The present disclosure also relates to a controller and to a computer program and a computer program product configured, when run on a computer to carry out a method for managing computation load of a fog node.

BACKGROUND

Fog computing refers to the extension of Cloud computing to the edge of a network, facilitating the operation of compute, storage, and networking services between end devices and cloud computing data centers. Fog computing may thus be considered as a complement to cloud computing, and is predicted to benefit varying domains including mobile/wearable computing, Internet of Things (IoT), and big data analytics. Some of the advantages afforded by fog computing include reducing latency, increasing throughput, consolidating resources, saving energy, and enhancing security and privacy. For example, in big data analytics, huge volumes of data are generated at the edge of network. Fog computing supports edge analytics, which can reduce the delay of big data analytics and decrease the cost of data transmission and storage.

In IoT applications, communication devices connected to one or more sensors can act as a fog node. Several fog nodes may form a fog network, within which fog nodes are connected to one another and may share computation. IoT devices may in many examples be mobile, and in a fog network in which shared computation is implemented, if a fog node moves away from or leaves the network, this may impact remaining fog nodes that were relying upon that fog node for shared computation. It may therefore be necessary to shift the computation carried out by the fog node that has moved or left the network to other fog nodes in the network, in order to deliver an uninterrupted experience for the end-user or customer. Failure to compensate for the departure of a fog node from a network may adversely affect the delivery of services provided by the fog network, at least until the sharing arrangements for computation in the fog network can be reorganised appropriately.

Similar issues to those described above may be envisaged in the event of a failure or other crisis situation. The application of fog computing to support use cases including ultra-low latency and delay tolerant networking increases the importance of being able to manage the computation load of a fog network in the event of a fog node going offline, or leaving the network.

Many real-world systems, including fog networks, may be understood as networks of mutually dependent subsystems. The connectivity between subsystems may be evaluated by various statistical measures of dependence. For a given system the mutual dependencies between the corresponding subsystems can be represented as a discrete structure called a weighted graph, where each subsystem is represented by a single vertex and each dependence by a connection (an edge) between two such vertices. Each edge can be labelled with a number called a weight. A weighted graph can be imagined as a set of points in a space connected by lines with different widths according to the weights. The graph representation of a system can be used to study the system's underlying properties with the help of graph theory. A set of graph-theoretical measures may be computed that characterise properties of the underlying graph and consequently of the whole system.

When considering a fog network, it may generally be assumed that fog nodes in the network are independently working with each other, with various fog nodes sharing computation tasks. Fog nodes may share data and computation both hierarchically (north-south) and at the same level (east-west). The dependencies between nodes in terms of data and computation sharing may be represented by the construction of a computation graph of the network as discussed above, helping to understand the connectivity between the network nodes. Current techniques for graph construction are based on correlation, so reflecting linear dependencies between nodes.

Identifying nodes that are likely to leave a network, or churn, is the goal of churn prediction algorithms. However, the tendency of fog nodes to work independently can complicate the challenge of identifying nodes that are likely to churn. Many inherent characteristics of fog networks can also complicate the task of churn prediction. Such characteristics may include low latency and location awareness, wide-spread geographical distribution, mobility, dense concentration of large numbers of nodes, predominant role of wireless access, strong presence of streaming and real-time applications, and heterogeneity. In addition, existing churn prediction and resource planning methods tend to assume advance knowledge of all nodes, which is highly unrealistic in a practical situation involving a complex, dynamic, heterogeneous network environment. Even if churn nodes can be accurately predicted or identified, the task of shifting computation performed by a node that is predicted to churn is not straightforward.

In order to know where and how to shift the computation load of the churn node, it is necessary to restructure the computation graph to account for the removal of the churn node. Such restructuring is a complex task, particularly in a dynamic, heterogeneous fog network environment, where different nodes may have different speed, latency, computation power and network bandwidth characteristics. In addition, accurate resource status information is often unavailable at a global level and the restructuring time for the graph may consequently be unacceptably high. Even the final result of a restructured computation graph may not be optimal, owing to the limitation of current methods to reflect only linear dependencies between nodes.

SUMMARY

It is an aim of the present disclosure to provide a method, apparatus and computer readable medium which at least partially address one or more of the challenges discussed above.

According to a first aspect of the present disclosure, there is provided a method for managing computation load of a fog node belonging to a fog network, wherein a computation capacity of the fog node is predicted to become unavailable to the fog network. The method comprises identifying, from among nodes of the fog network, a candidate set of nodes for computational load transfer from the fog node, wherein the candidate set is identified on the basis of Mutual Information between the fog node and other nodes of the fog network. The method further comprises obtaining a computation graph representing computation in the fog network, the computation graph including the fog node, and using a learning model to identify a morphism from the obtained computation graph to a new computation graph, in which the fog node is not included, which morphism preserves computation of the obtained computation graph while minimising a loss function. The identified morphism comprises a sequence of one or more morphing operations that replaces the fog node in the obtained computation graph with a topology of one or more nodes selected from the candidate set. The method further comprises causing computation performed at the fog node to be transferred to one or more nodes of the candidate set in accordance with the identified morphism.

According to examples of the present disclosure, the method may be performed in a node of the fog network, and may specifically be performed in a parent node of the fog node that is predicted to become unavailable. According to examples of the present disclosure, the computation capacity of the fog node may become unavailable to the network in a variety of ways, including for example the fog node entering an inactive state, experiencing a fault, losing network connectivity or churning out of the fog network. The fog node may thus in some examples remain operational, but its computational capacity is no longer available to the network, for example because a failure of network connectivity means that it can no longer communicate with other nodes in the fog network, or because it has churned out of the network.

According to examples of the present disclosure, a morphism which preserves computation of the obtained computation graph may comprise a morphism following which all computations that were performed in the fog node according to the obtained computation graph are transferred to other nodes in the fog network, which nodes are capable of performing the computations and have sufficient capacity to do so.

According to examples of the present disclosure, morphing operations may comprise at least one of length, width and subnet morphing, and a topology of nodes may comprise an arrangement of nodes including their interconnectivity and connectivity with the rest of the network.

According to examples of the present disclosure, identifying a candidate set of nodes for computational load transfer from the fog node may comprise computing Mutual Information between the fog node and other nodes of the fog network, and adding to the candidate set any nodes having a Mutual Information value with the fog node that is above a threshold level.

According to examples of the present disclosure, the threshold level may be selected to provide a sufficiently large candidate set to ensure a suitable morphism may be identified without excessively increasing the computational complexity of the method. In some examples, the threshold may be selected to be the first quartile of a vector of the Mutual information values of nodes in the fog network. In other examples, the threshold may be selected to ensure a candidate set of a given size, such as the X nodes with the highest value of Mutual Information with the fog node. In still further examples, a Mutual Information value may be selected for the threshold.

According to examples of the present disclosure, the method may further comprise filtering nodes in the fog network according to their geographical separation from the fog node before calculating Mutual Information. The filter may be selected according to the nature and geographical spread of the fog node, and may vary according to the particular deployment under consideration.

According to examples of the present disclosure, Mutual Information between the fog node and other nodes of the fog network may be calculated according to:

$$I(X;Y) = \sum_{\{x,y\}} P_{XY}(x,y) \log P_{XY}(x,y)$$

Where $P_{XY}(x,y)$ is the joint probability distribution of the fog node and another node in the fog network.

According to examples of the present disclosure, the computation graph may comprise the fog node and nodes from the candidate set. According to examples of the present disclosure, the computation graph may also comprise a parent node of the fog node, which parent node may be conducting the method. According to examples of the present disclosure, the computation graph may comprise all nodes that will be affected by the computational capacity of the fog node becoming unavailable to the fog network, which may include all nodes connected to the fog node, all nodes providing computations that are used by the fog node, all nodes providing computations that are used by a parent node of the fog node, or some other combination of nodes in the fog network. According to some examples of the present disclosure, the computation graph may comprise all nodes in the fog network.

According to examples of the present disclosure, obtaining a computation graph representing computation in the fog network may comprise at least one of generating the computation graph representing computation in the fog network, or retrieving the computation graph representing computation in the fog network from a memory.

According to examples of the present disclosure, using a learning model to identify a morphism from the obtained computation graph to a new computation graph, in which the fog node is not included, which morphism preserves computation of the obtained computation graph while minimising a loss function, may comprise initiating the model to a current state of the fog network and sampling actions from a subset of possible actions in the current state. Using a learning model may further comprise, for sampled actions, computing a loss function, and selecting from the sampled actions a sequence of actions that results in the new computation graph which preserves the computation actions of the fog node while minimising the loss function.

According to examples of the present disclosure, the learning model may be implemented in a deep Neural Network.

According to examples of the present disclosure, an action may comprise a morphing operation using one or more nodes from the candidate set. According to examples of the present disclosure, an action may comprise a morphing operation and the subset of possible actions may comprise morphing operations including length morphing, width morphing and subnet morphing.

According to examples of the present disclosure, the loss function may comprise a function of at least one of computation loss, latency and data loss. According to examples of the present disclosure, for a morphing operation using a node from the candidate set, computation loss may comprise a number of processes running in the fog node minus a number of processes that can be immediately started in the node from the candidate set. Latency may comprise an amount of time required to shift computation from the fog node to the node from the candidate set. Data loss may comprise an amount of data currently handled by applications running on the fog node multiplied by a data transmission time to the node of the candidate set.

According to examples of the present disclosure, the method may further comprise monitoring a state of nodes in the fog network, and identifying the fog node as a fog node, the computation capacity of which is predicted to become unavailable to the fog network.

According to examples of the present disclosure, identifying the fog node as a fog node, the computation capacity of which is predicted to become unavailable to the fog network may comprise performing a method according to any one of the examples disclosed in PCT/IN2017/050611.

According to another aspect of the present disclosure, there is provided a computer program comprising instructions which, when executed on at least one processor, cause the at least one processor to carry out a method according to any one of the preceding aspects or examples of the present disclosure.

According to another aspect of the present disclosure, there is provided a carrier containing a computer program the preceding aspect of the present disclosure, wherein the carrier comprises one of an electronic signal, optical signal, radio signal or computer readable storage medium.

According to another aspect of the present disclosure, there is provided a computer program product comprising non transitory computer readable media having stored thereon a computer program according to any a preceding aspect of the present disclosure.

According to another aspect of the present disclosure, there is provided a controller for managing computation load of a fog node belonging to a fog network, wherein a computation capacity of the fog node is predicted to become unavailable to the fog network. The controller comprises a processor and a memory, the memory containing instructions executable by the processor such that the controller is operable to identify, from among nodes of the fog network, a candidate set of nodes for computational load transfer from the fog node, wherein the candidate set is identified on the basis of Mutual Information between the fog node and other nodes of the fog network. The controller is further operable to obtain a computation graph representing computation in the fog network, the computation graph including the fog node, and to use a learning model to identify a morphism from the obtained computation graph to a new computation graph, in which the fog node is not included, which morphism preserves computation of the obtained computation graph while minimising a loss function. The identified morphism comprises a sequence of one or more morphing operations that replaces the fog node in the obtained computation graph with a topology of one or more nodes selected from the candidate set. The controller is further operable to cause computation performed at the fog node to be transferred to one or more nodes of the candidate set in accordance with the identified morphism.

According to examples of the present disclosure, the controller is further operable to carry out a method according to any one of the preceding aspects or examples of the present disclosure.

According to another aspect of the present disclosure, there is provided a controller for managing computation load of a fog node belonging to a fog network, wherein a computation capacity of the fog node is predicted to become unavailable to the fog network. The controller is adapted to identify, from among nodes of the fog network, a candidate set of nodes for computational load transfer from the fog node, wherein the candidate set is identified on the basis of Mutual Information between the fog node and other nodes of the fog network. The controller is further adapted to obtain a computation graph representing computation in the fog network, the computation graph including the fog node, and to use a learning model to identify a morphism from the obtained computation graph to a new computation graph, in which the fog node is not included, which morphism preserves computation of the obtained computation graph while minimising a loss function. The identified morphism comprises a sequence of one or more morphing operations that replaces the fog node in the obtained computation graph with a topology of one or more nodes selected from the candidate set. The controller is further adapted to cause computation performed at the fog node to be transferred to one or more nodes of the candidate set in accordance with the identified morphism.

According to examples of the present disclosure, the controller is further operable to carry out a method according to any one of the preceding aspects or examples of the present disclosure.

BRIEF DESCRIPTION OF THE DRAWINGS

For a better understanding of the present invention, and to show more clearly how it may be carried into effect, reference will now be made, by way of example, to the following drawings, in which.

DETAILED DESCRIPTION

Aspects of the present disclosure thus provide a method that allows for the efficient shifting of computation from a fog node, whose computation capacity is predicted to become unavailable to the fog network, to other nodes in the fog network. The method involves the assembly of a candidate set of nodes to take over at least some of the computation of the fog node, the candidate set being assemble on the basis of Mutual Information. The method then makes use of graph theory, using a learning model to identify a morphism from a computation graph of the fog network that includes the fog node to a new computation graph that does not include the fog node. The morphism is a sequence of one or more morphing actions that replace the fog node with a topology of nodes from the candidate set. The learning model enables the identification of a morphism that will preserve the overall computation of the original computation graph while minimising a loss function reflecting a cost of the morphism to the operation of the network. The cost may be measured in time, computational efficiency or any combination of measures reflecting the impact on the network of implementing computational shift according to the morphism.

Aspects of the present disclosure may be implemented in any fog network, in which the computation of a complex operation in fog nodes may be delegated to hierarchical nodes to leverage adjacent resource. One example use case for a fog network is in virtual reality applications associated with wearable technology such as smart glasses. Some of the information retrieval and computation tasks required to implement the virtual reality experience may be carried out on the glasses, while an associated element in the fog network hierarchy, for example a smartphone, may handle its storage and connectivity requirements. This hierarchical architecture may leverage both devices at the same time, with an intelligent division of computation between the devices. Another example use case for fog networks is in autonomous vehicles, for which real time surveillance and traffic condition monitoring may be achieved by road side units (RSU) and vehicles. Autonomous vehicles are discussed in greater detail below, in the contest of an example implementation of methods according to the present disclosure.

Figure 1:
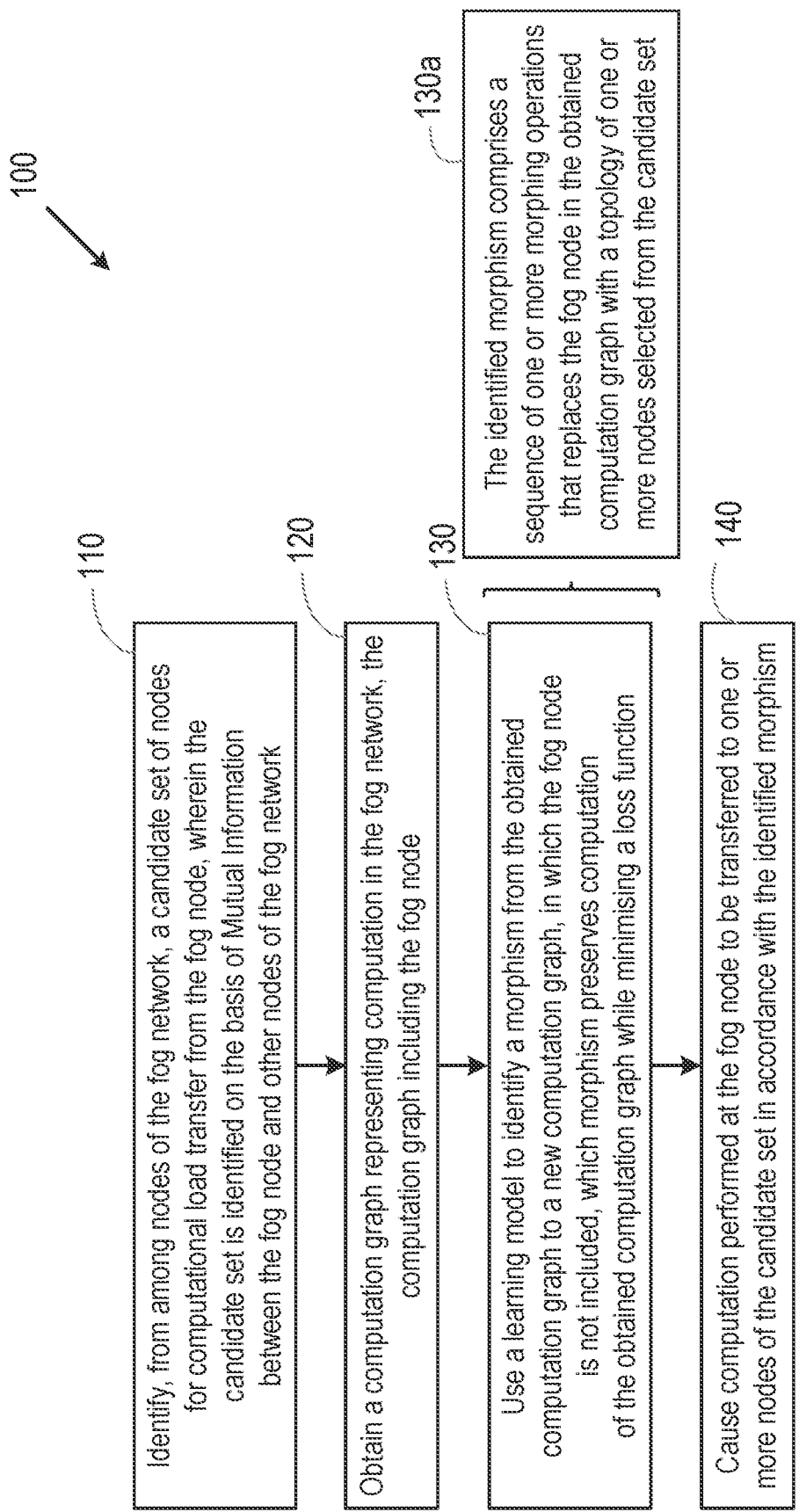
FIG. 1 is a flow chart illustrating process steps in a method for managing computation load of a fog node.

FIG. 1 is a flow chart illustrating process steps in a method 100 for managing computation load of a fog node belonging to a fog network, wherein a computation capacity of the fog node is predicted to become unavailable to the fog network. The method may be conducted in another node of the fog network, and may for example be conducted in a parent node of the fog node. The computation capacity of the fog node may be predicted to become unavailable to the fog network for a variety of reasons, including the fog node leaving the network, entering an inactive state or experiencing a loss of network connectivity. Referring to FIG. 1, in a first step 110, the method comprises identifying, from among nodes of the fog network, a candidate set of nodes for computational load transfer from the fog node, wherein the candidate set is identified on the basis of Mutual Information between the fog node and other nodes of the fog network. The method then comprises, at step 120, obtaining a computation graph representing computation in the fog network, the computation graph including the fog node. In step 130, the method comprises using a learning model to identify a morphism from the obtained computation graph to a new computation graph, in which the fog node is not included, which morphism preserves computation of the obtained computation graph while minimising a loss function. As illustrated in step 130a, the identified morphism comprises a sequence of one or more morphing operations that replaces the fog node in the obtained computation graph with a topology of one or more nodes selected from the candidate set. In step 140, the method comprises causing computation performed at the fog node to be transferred to one or more nodes of the candidate set in accordance with the identified morphism.

Figure 2A:
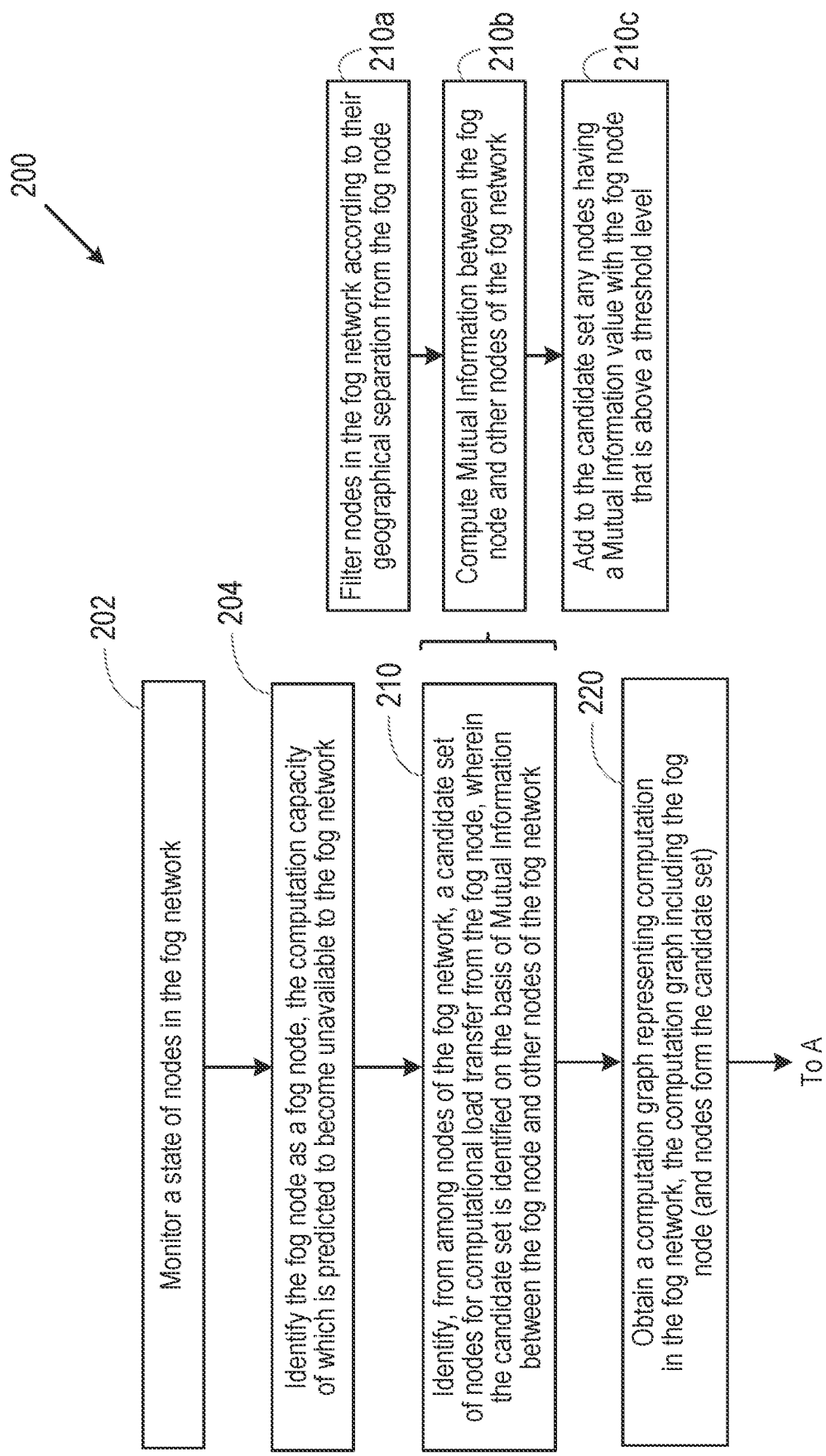
FIGS. 2a and 2b show flow charts illustrating process steps in another example of method for managing computation load of a fog node.
Figure 2B:
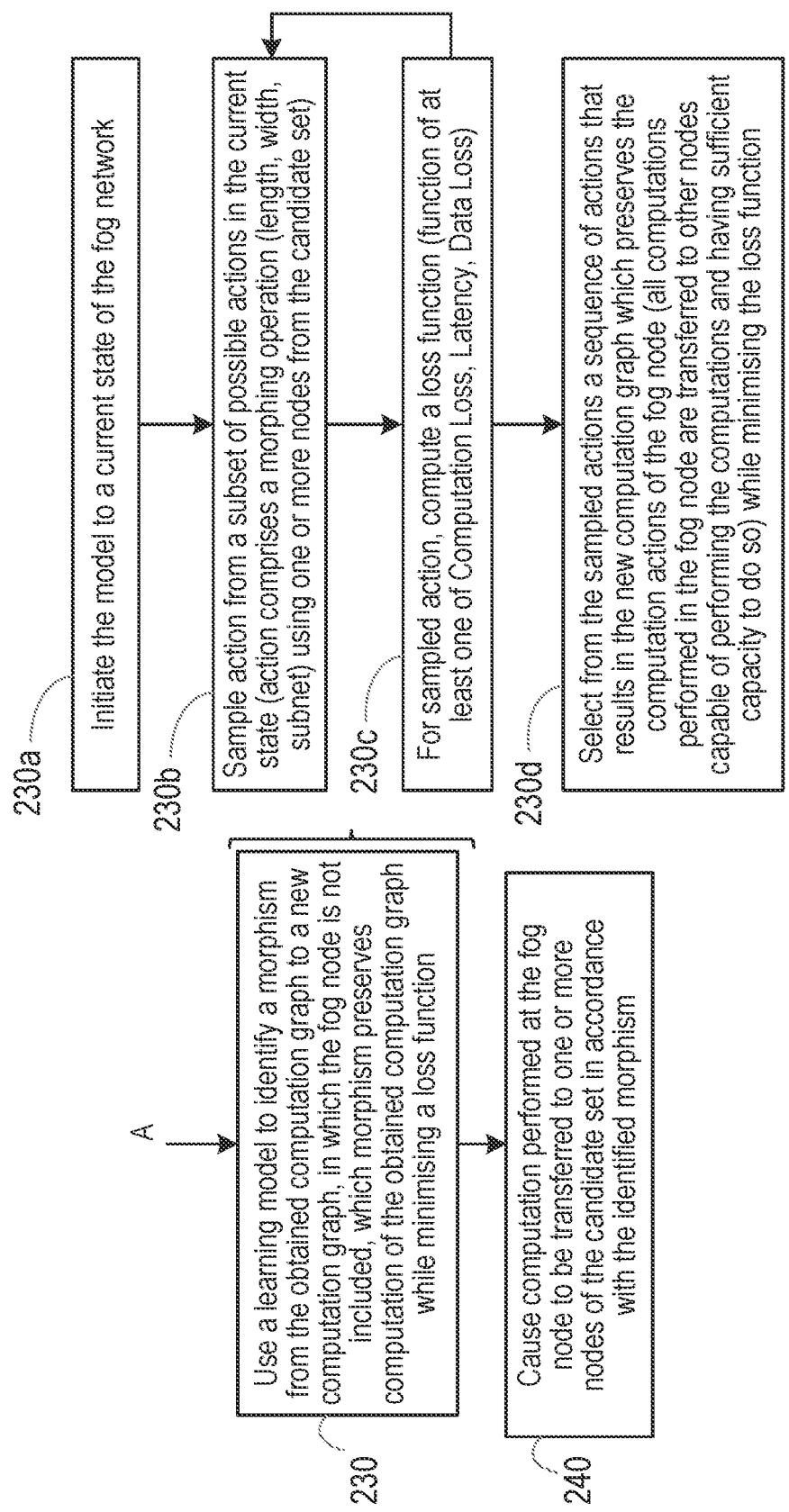

FIGS. 2a and 2b show a flow chart illustrating process steps in another example of a method 200 for managing computation load of a fog node belonging to a fog network, wherein a computation capacity of the fog node is predicted to become unavailable to the fog network. The steps of the method 200 illustrate one way in which the steps of the method 100 may be implemented and supplemented in order to achieve the above discussed and additional functionality. As for the method of FIG. 1 above, the method 200 may be conducted in another node of the fog network, and may for example be conducted in a parent node of the fog node. The computation capacity of the fog node may be predicted to become unavailable to the fog network for a variety of reasons, including the fog node leaving the network, entering an inactive state or experiencing a loss of network connectivity.

Referring to FIG. 2a, the method comprises monitoring a state of nodes in the fog network in step 202 and, in step 204, identifying the fog node as a fog node the computation capacity of which is predicted to become unavailable to the fog network. This identification step may be implemented in different ways according to the reason for which the computational capacity of the fog node is predicted to become unavailable to the fog network. For example, in a delay tolerant network in which losses of network connectivity are relatively frequent, monitoring network connectivity of nodes in the network may enable the identification of particular fog nodes that may be predicted to lose network connectivity at a certain time. In another example, an IoT fog node may cycle through scheduled and/or periodic transitions between an active state and an inactive state. When in the inactive state, the computational capacity of the node may not be available to the fog network. Monitoring the state transitions of the IoT fog node may enable prediction of when the IoT fog node will transition to an inactive state. In a still further example, a range of factors may contribute to being able to predict when a node may churn out of the network. In the example of a fog network supporting autonomous vehicles, monitoring the movement of a fog node associated with a vehicle may enable a predicted trajectory to be assembled, and may enable identification of a fog node that is predicted to leave the geographical coverage area of the fog network, and so churn out of the network. PCT/IN2017/050611 discloses a plurality of example method which may be used to predict a probability of a state change of a node in a network such as a fog network. Such methods may be used to implement the step 204 of identifying the fog node as a fog node whose computational capacity is predicted to become unavailable to the fog network.

Referring still to FIG. 2a, in step 210, the method 200 comprises identifying, from among nodes of the fog network, a candidate set of nodes for computational load transfer from the fog node, wherein the candidate set is identified on the basis of Mutual Information between the fog node and other nodes of the fog network. As illustrated in step 210a, the identification of a candidate set of nodes may first comprise filtering nodes in the fog network according to their geographical separation from the fog node. The level of filtering may be selected according to the geographical coverage area of the fog network, and the density of fog nodes within the network. For example, in a municipal fog network supporting autonomous vehicles, filtering out nodes in the fog network with a geographical separation from the fog node of greater than between 2 and 10 km may be appropriate. In a fog network supporting operational of an industrial site, filtering on a separation level measured in meters, tens or hundreds of meters may be more appropriate. This initial filtering step may reduce the computation load associated with later steps involving the computation of mutual information values for the retained nodes.

In step 210*b*, the identification of a candidate set of nodes comprises computing Mutual Information between the fog node and other nodes of the fog network, the other nodes comprising those nodes retained after the filtering step 210*a*. Mutual Information between the fog node and other nodes of the fog network is calculated according to:

$$I(X;Y) = \sum_{\{x,y\}} P_{XY}(x,y) \log P_{XY}(x,y)$$

where $P_{XY}(x,y)$ is the joint probability distribution of the fog node and another node in the fog network, the probability distributions being the probability distribution functions of fog node features which represent the characteristics of the fog nodes. As discussed in greater detail below, Mutual Information is a dimensionless quality measuring how much information one random variable provides about another random variable. In step 210*c*, identifying a candidate set of nodes comprises adding to the candidate set any nodes having a Mutual Information value with the fog node that is above a threshold level.

The threshold level may be selected to provide a sufficiently large candidate set to ensure a suitable morphism may be identified in subsequent method steps without excessively increasing the computational complexity of the method. In some examples, the threshold may be selected to be the first quartile of a vector of the Mutual information values of nodes in the fog network. In other examples, the threshold may be selected to ensure a candidate set of a given size, such as the X nodes with the highest value of Mutual Information with the fog node. In still further examples, a Mutual Information value may be selected for the threshold.

Referring still to FIG. 2*a*, the method 200 further comprises, in step 220, obtaining a computation graph representing computation in the fog network, the computation graph including the fog node. The computation graph may comprise the fog node and nodes from the candidate set, and may also comprise a parent node of the fog node, which parent node may be conducting the method. In some examples, the computation graph may comprise all nodes that will be affected by the computational capacity of the fog node becoming unavailable to the fog network, which may include all nodes connected to the fog node, all nodes providing computations that are used by the fog node, all nodes providing computations that are used by a parent node of the fog node, or some other combination of nodes in the fog network. In some examples, the computation graph may comprise all nodes in the fog network.

Obtaining the computation graph representing computation in the fog network may comprise at least one of generating the computation graph representing computation in the fog network, or retrieving the computation graph representing computation in the fog network from a memory.

Referring now to FIG. 2*b*, the method 200 further comprises using a learning model to identify a morphism from the obtained computation graph to a new computation graph, in which the fog node is not included, which morphism preserves computation of the obtained computation graph while minimising a loss function. As discussed above, a morphism comprises a sequence of one or more morphing operations that replaces the fog node in the obtained computation graph with a topology of one or more nodes selected from the candidate set. A morphism which preserves computation of the obtained computation graph comprises a morphism following which all computations performed in the fog node are transferred to other nodes capable of performing the computations and having sufficient capacity to do so.

The step 230 may initially comprise initiating the model to a current state of the fog network in step 230*a*. Step 230 then comprises sampling actions from a subset of possible actions in the current state at step 230*b* and, for sampled actions, computing a loss function in step 230*c*. Step 230 then comprises, at 230*d*, selecting from the sampled actions a sequence of actions that results in the new computation graph which preserves the computation actions of the fog node while minimising the loss function. The learning model may be implemented in a deep Neural Network.

With reference to step 230*b*, an action comprises a morphing operation, using one or more nodes from the candidate set. The subset of actions comprises morphing operations including length morphing, width morphing and subnet morphing. Each of these morphing operations is discussed in greater detail below, with reference to FIGS. 5 to 7.

With reference to step 230*c*, the loss function comprises a function of at least one of computation loss, latency and data loss. For a morphing operation using a node from the candidate set, computation loss comprises a number of processes running in the fog node minus a number of processes that can be immediately started in the node from the candidate set. Latency comprises an amount of time required to shift computation from the fog node to the node from the candidate set, and data loss comprises an amount of data currently handled by applications running on the fog node multiplied by a data transmission time to the node of the candidate set.

Having identified the morphism in step 230, the method 200 then comprises causing computation performed at the fog node to be transferred to one or more of the nodes in the candidate set in accordance with the identified morphism. This may comprise messaging individual nodes to arrange for the required data transfer and initiating of appropriate processes in the nodes taking over computation tasks from the fog node.

Examples of the present disclosure thus provide for the auto-shifting of a fog node's computation into nearby fog node(s) based on a range of considerations. These considerations may be taken into account through the construction and manipulation of a computation graph, and the use of a loss function, and may include the assessment of a computational load to be transferred, graph structure node availability and type of activations, memory, storage, computation power, battery power etc. How to shift the computation load of a fog node in accordance with these considerations may be established using a learning model with Neural Network function approximation.

As discussed above, examples of the present disclosure may be used to manage the computational load of a fog node whose computational capacity is predicted to become unavailable to the fog network. This may be for a variety of reasons, one of which is network churn. For simplicity, the remainder of the present specification refers to the example of a computation capacity becoming unavailable as a result of network churn, and thus refers to the node whose capacity is predicted to become unavailable as a or the churn node. It will be appreciated that this is merely for the purposes of illustration, and that other causes of a node's computational capacity becoming unavailable to the network are also encompassed by the following discussion.

Figure 3:
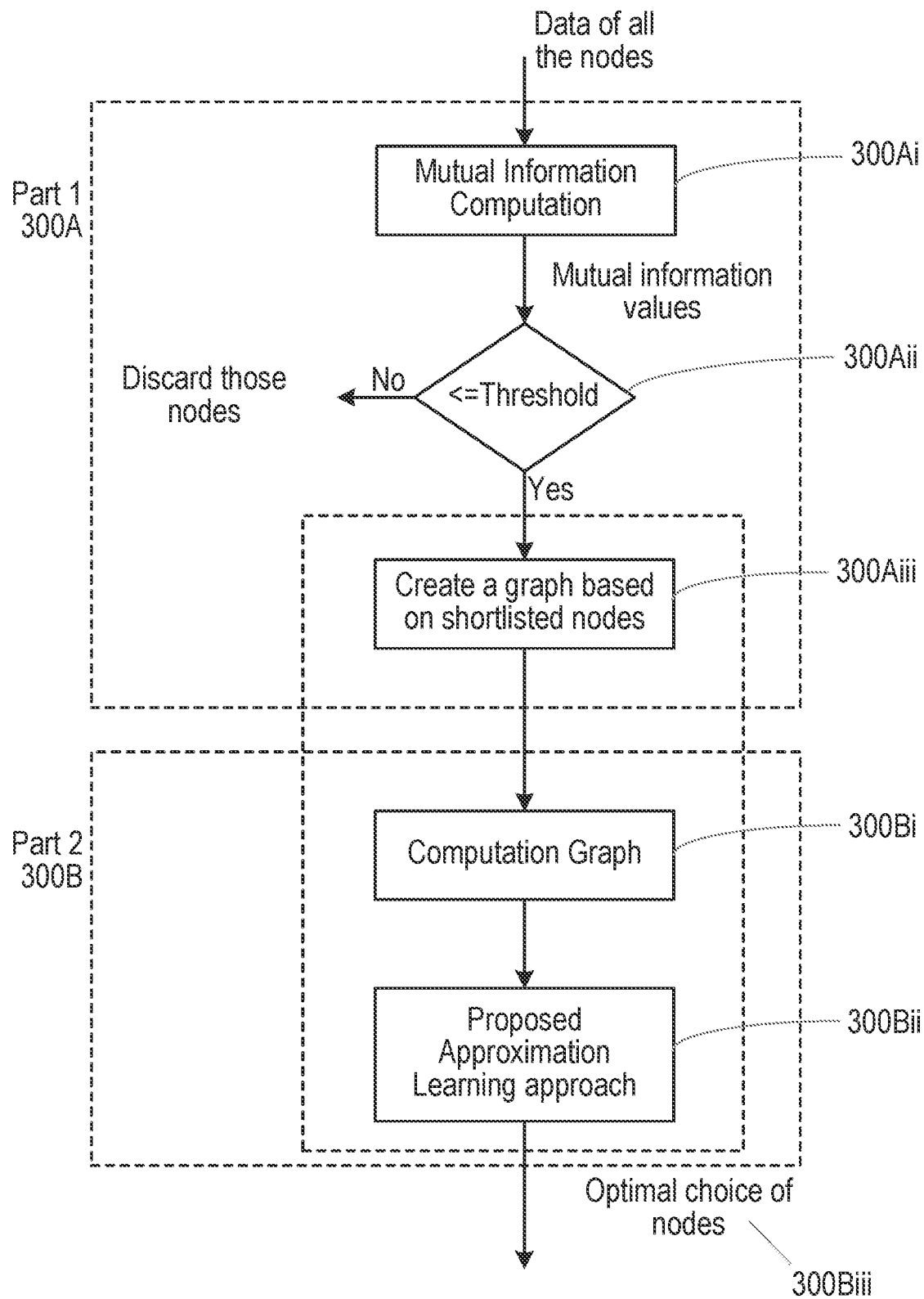
FIG. 3 is a representation of example methods according to FIG. 1 or 2.

After identifying a node that is predicted to churn, for example using techniques discussed in PCT/IN2017/050611, example of the present disclosure enable the auto-shifting of that node's computational load to other nodes in the network, so taking preventative measures to ensure continuity of operation of the fog network and so continuity of service to end users. Methods according to the present disclosure may be considered as encompassing two parts: a first part in which nearby nodes which have some relation with churn node are identified, and a second part in which the manner in which one or more of those nodes should take over computation load of the churn node is identified. Examples of the present disclosure call on a range of techniques including deriving Mutual Information, developing topology to preserve a computation graph and approximation learning for maximizing gain. The two parts discussed above are represented in FIG. 3 and may be considered to include the following steps:

Part 1 (300A)
1. Nodes near to the churn node are identified.
2. For identified nodes having a connection with the fog node, a Mutual Information value is calculated 300Ai to filter out the less relevant nodes 300Aii.
3. From the remaining nodes, which include the churn node, connections and important features among nodes are derived from a computation graph 300Aiii/300Bi.

Part 2
4. Morphing actions applied to the computation graph of the remaining nodes are explored, a learning engine which uses neural network-based approximation to find possible topologies for replacing the churn node and related consequences for the network in the form of gain or loss 300Bi/300Bii.
5. After evaluating the feedback, nodes with an optimal topology are selected to form the morphed computation graph and so shift the computation tasks of the churn node 300Biii.

Examples of the present disclosure thus explore possible topologies of candidate nodes that may allow for morphing of the computation graph to accommodate removal of the churn node, using a learning engine. The use of Mutual Information to identify nodes of a candidate set enables an accurate reflection of the dependencies between the nodes in the fog network.

Example illustrations of methods of the present disclosure reference the OpenFog Reference Architecture (RA). However the methods proposed herein may be integrated with any other architecture with minimum changes. OpenFog RA enables fog-cloud and fog-fog interfaces and offers several unique advantages over other approaches, which advantages are referred to as SCALE (Security, Cognition, Agility, Latency, Efficiency).

Examples of the present disclosure employ Approximation Learning based graph morphing, which is now discussed in greater detail.

A computation graph may be constructed when some running activity/job is distributed among multiple fog nodes. The graph details are stored in the parent node or some child node working as coordinator for that activity. Examples of the present disclosure apply deep Approximation Learning based methods and apparatus for dynamically shifting the computation from a churning fog node to other available nodes so that the total computation graph is morphed but not lost.

Methods according to the present disclosure morph a computation graph of a fog network including a churn node to a new computation graph excluding the churn node in such a manner that the overall computational functions of the graph can be completely preserved. The morphism identifies the nodes in the fog network to which the computation performed by the churn node may be shifted. This graph morphism is scalable and may include different morphing types, including changes of depth, width, core computation units (CPU, memory etc.) and sub graphs. This morphism is also capable of handling nonlinear relationships in a fog network.

Approximation Learning provides both exploration and exploitation for the identification of an optimal morphism. Exploration in terms of finding a better topology to replace the churn node than has been tried before. Exploitation in terms of trying things that have worked best in the past. Standard supervised learning algorithms are generally purely exploitative. In the scenario of a complex, dynamic, heterogeneous fog environment, the approximation learning proposed in the present disclosure offer greater efficiency than standard Machine Learning (ML) methods. Implementing the proposed algorithm is not computationally complex, as it is already learned when compared with normal ML methods which involve significant amounts of training. The proposed approximation learning algorithm can adapt to any kind of environment as it involves significant exploration and is thus well suited to a fog node environment having different inherent characteristics. The proposed approximation learning algorithm is trained completely by self-learning, starting from random states without any supervision or human intervention. For example, in contrast to a Reinforcement Learning based approach, a single, unified neural network may be implemented instead of separate policy and value networks. The search for valid topological morphing actions is based on this single neural network to assess gain/loss and actions. The algorithm hence needs less computing power than many ML algorithms and so is suitable for use in fog nodes. The learning model has a fast training phase producing steady improvement and precise learning.

A detailed implementation of methods according to the present disclosure is now discussed.

Referring again to FIG. 2a, once a churn node has been identified at step 204, the presence of other fog nodes in the area is investigated. This process identifies and filters the list of available nearby fog nodes in the area. The inputs to this identification stage include features of the churn node including its distance to other nodes, earlier communication events between the nodes, etc. The output is a candidate set of neighbor nodes which may take over some or all of the computation load for the churn node.

Steps to identify the neighboring nodes to probable fog node predicted to churn are discussed below:

As per fog consortium standards, the data of all the fog nodes are transmitted and stored in cloud. After transmitting, these data are stored in the cloud to perform computation. The time between two successive data transfers is chosen based on the bandwidth of the communication system, computational capacity of the system and end application.

The histogram of the individual readings is plotted and empirical probability density function (pdf) is fit for all the fog node readings. In this way, the probability distribution function of the fog node features which represent the characteristics of the fog node is assembled. The entire process is automated, and the data is stored in the server.

Subsequently, the Mutual Information (MI) between the probable churning fog node 'A' and other fog nodes is calculated using the estimated pdf. MI is one of many quantities that measures how much one random variables tells about another. It is a dimensionless quantity with (generally) units of bits, and can be thought of as the reduction in uncertainty about one random variable given knowledge of another. High MI indicates a large reduction in uncertainty; low MI indicates a small reduction; and zero MI between two random variables means the variables are independent.

For two discrete variables X and Y whose joint probability distribution is $P_{XY}(x,y)$, the MI between them, denoted as $I(X;Y)$, is given by $$I(X;Y) = \sum_{\{x,y\}} P_{XY}(x, y) \log P_{XY}(x, y)$$

In the above formula, only discrete sequences are used. However, it is possible to extend the formula to continuous sequences by replacing the summation with an integral. To understand what $I(X;Y)$ actually means, it is first appropriate to define entropy and conditional entropy. Qualitatively, entropy is a measure of uncertainty—the higher the entropy, the greater the level of uncertainty about a random variable. Here X corresponds to the pdf of a one fog node and Y corresponds to pdf of another fog node. A lower MI value means that nodes are weakly connected, and a higher MI value means that nodes are strongly connected. The higher MI means the nodes are that much closer. More details about the computation is given in illustration.

It will be appreciated that the greater the number of nodes under consideration, the greater the complexity of the overall problem of identifying how to shift computation of a churn node. It is therefore proposed to filter the nodes for which MI values are calculated on the basis of geographical separation from the predicted churn node. For example in an urban fog network supporting autonomous vehicles, in which the fog nodes comprise vehicles and road side units, it may be appropriate to limit consideration of neighbor nodes to those fog nodes within 5 km of the predicted churn node. The computation of mutual information and results may then be stored in a global node (for example a cloud master node).

A threshold for MI value may then be applied, with nodes having an MI value with the predicted churn node that is below the threshold being discarded, and nodes having an MI value with the predicted churn node that is above the threshold value being added to the candidate set of nodes for computational load transfer. In some examples, this threshold may correspond to the significance level estimation in machine learning applications. This value can be obtained from surrogate data techniques like Monte-Carlo simulations or bootstrapping techniques. In one example, those nodes whose MI is present in the first quantile of the entire MI vector may be discarded, with the remaining nodes being added to the candidate set. For example, in the sample graph illustrated in FIG. 10 and discussed in greater detail below, the first quantile of the mutual information vector is 0.165. Hence, the nodes whose mutual information is less than 0.165 (B1, B6, B8) can be discarded. Other examples of threshold may be envisaged, as mentioned above. It will be appreciated that as threshold increases, the candidate set of nodes for shifting the computation of the predicted churn fog node is reduced, so reducing the options for morphing the computation graph. However, increasing the number of nodes in the candidate set increases the computational complexity of the algorithm for identifying an optimal morphism, and so it may be appropriate to seek a balance between operational flexibility and computational complexity.

Figure 4:
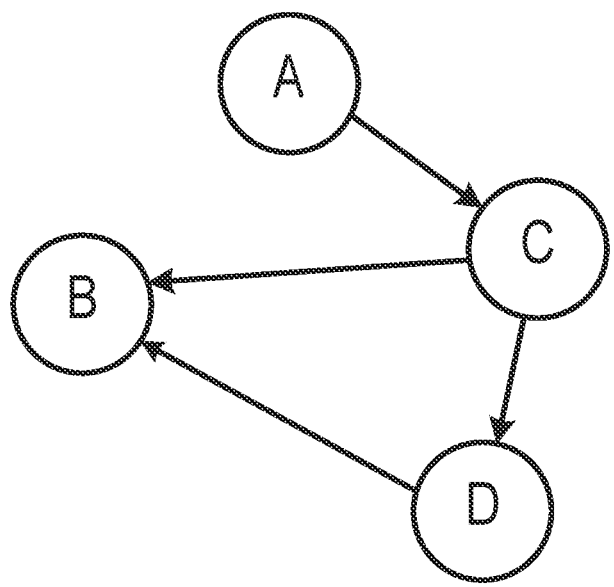
FIG. 4 illustrates an example computation graph.

From the identified neighbor nodes of the candidate set, the computation graph is then obtained, which computation graph includes the predicted churn node. The computation graph may be generated by the node performing the method, or may be at least partially retrieved from a memory. The computation graph illustrates the connections between the nodes of the candidate set and the predicted churn node. As example computation graph for a network of 4 nodes is illustrated in FIG. 4.

Having assembled the candidate set and the computation graph, aspects of the present disclosure then seek to identify how to shift the computation load of the predicted churn node to nodes from the candidate set which have sufficient capacity to accept this load. One option would be to do this using trial and error, trailing every node according to its capability and hardware requirements. However, this problem is NP-hard, and the complexity of the problem increases exponentially with the number of neighbor nodes in the candidate set. Examples of the present disclosure propose instead to use an approximation-based learning method to discover the optimal manner in which computation load of the predicted churn node may be shifted to a node or nodes from the candidate set.

As discussed above, the distributed computation over fog nodes may be considered as a computation graph. In this graph, the vertices represent fog nodes that carry out a part of computation for a complete application and edges represent the inter dependency among the nodes. Once a vertex completes its own part of a computation, its transfers the result to the other nodes to which it is connected (north-south or east-west). If a mobile fog node is about to move out of the fog network, examples of the present disclosure can optimally shift the computation from that node to other available nodes so that total computation graph is morphed but not lost. Hence the application supported by the computation of the nodes remains functional without any interruption of service.

Figure 5:
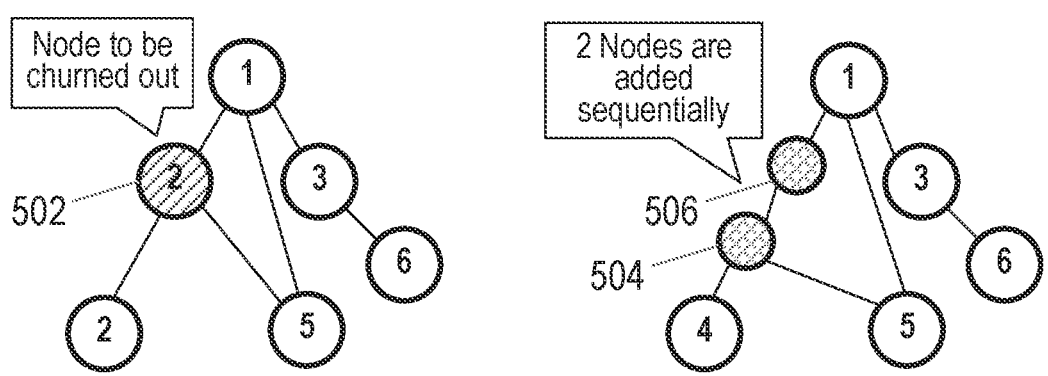
FIG. 5 illustrates an example of length morphing.
Figure 6:
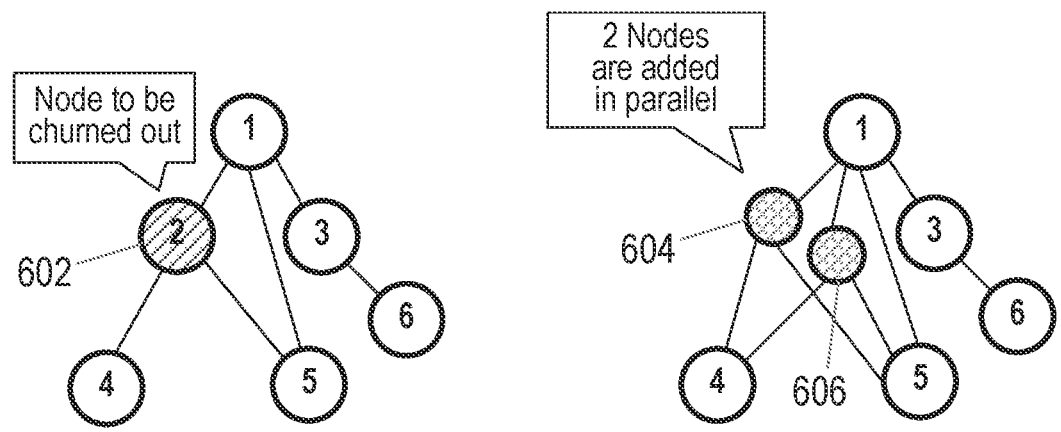
FIG. 6 illustrates an example of width morphing.
Figure 7:
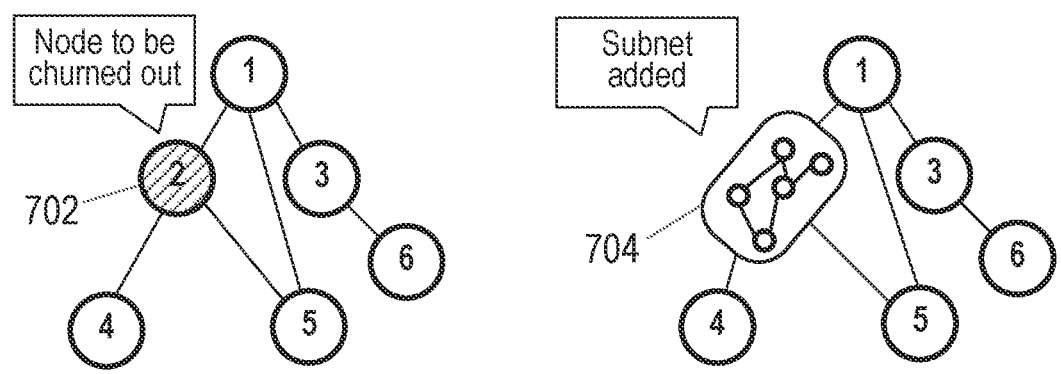
FIG. 7 illustrates an example of subnet morphing.

The morphing of the computation graph according to examples of the present disclosure may be performed in three different ways; length morphing, width morphing and subnet morphing. Length morphing is illustrated in FIG. 5, and refers to an arrangement in which, when a fog node 502 is churned out of the network, its computation load is shifted to one or more node(s) 504, 506 by adding them sequentially. Width morphing is illustrated in FIG. 6, and refers to an arrangement in which, when a fog node 602 is churned out of the network, its computation load is shifted to one or more node(s) 604, 606 by adding them in parallel. A scenario may also be envisaged in which a set of nodes always stay together, and the computational load of a churn node may be shifted to the group. In such a scenario, the group of nodes would be directly connected as subnet and this is therefore referred to as subnet morphing, illustrated in FIG. 7, in which a predicted churn node 702 is replaced by subnet 704.

A complex fog network morphism, in which a single fog node is replaced by a topology of nodes including the nodes themselves, their interconnections and their connections with the remaining nodes of the graph, can be achieved with a combination of the three basic morphing operations described above.

According to examples of the present disclosure, an Approximation Learning engine may learn the optimal policy of the computation shift and morph the graph topology accordingly. The fog network graph is a hierarchical architecture and when a child node goes out of the network, the immediate parent node can detect it. The learning algorithm at the parent node may works as an entity where an action is defined as shifting the computation of the churning child to one or more nodes, and the approximator function is calculated based on computation loss, data loss, latency, etc. related to task efficiency in shifting computation to a particular node. The engine learns an optimal policy based on the graph structure and morphs the graph into a new one using a sequence of basic morphing operations as described above so that nonlinearity and computation can best be preserved.

Here, the task is a finite Markov Decision Process (finite MDP). The stochastic policy at time t is defined with respect to an action a and a state s as:

$$\pi(a|s) \triangleq \mathbb{P}[A(t)=a|S(t)=s]$$

Let there be N(a) actions and N(s) states. Two entities are defined: the node and the organizer. The node entity's stochastic behavior resembles the behavior of fog nodes in the real world. The organizer entity plays its actions based on the deep learning-based approach of examples of the present disclosure. This is an attempt to morph and restructure the computation graph within the fog environment to preserve the computation functions. Actions may preserve the computational functions of the computation graph or they may worsen them. For an action to be considered valid for the organizer entity, it must preserve the computation functions in the next state of the graph, following the action being carried out. The vector a ($a \in \mathbb{R}^n$, $a \triangleq (a_0, a_1, a_2, \ldots a_n)$ where n denotes number of actions taken) denotes the vector of actions taken by the organizer entity for the purposes of approximation learning computation. The environment is a dynamic, heterogeneous fog network in which the two entities interact. The organizer attempts to maximize the gain r, which resembles preserving the computational functions by finding a valid action, while the nodes attempt to break the computation functions randomly. The fog nodes are scattered according to a homogeneous Poisson point process (PPP) with a parameter A=N users.

$N \sim Poi(\lambda)$.

Figure 8:
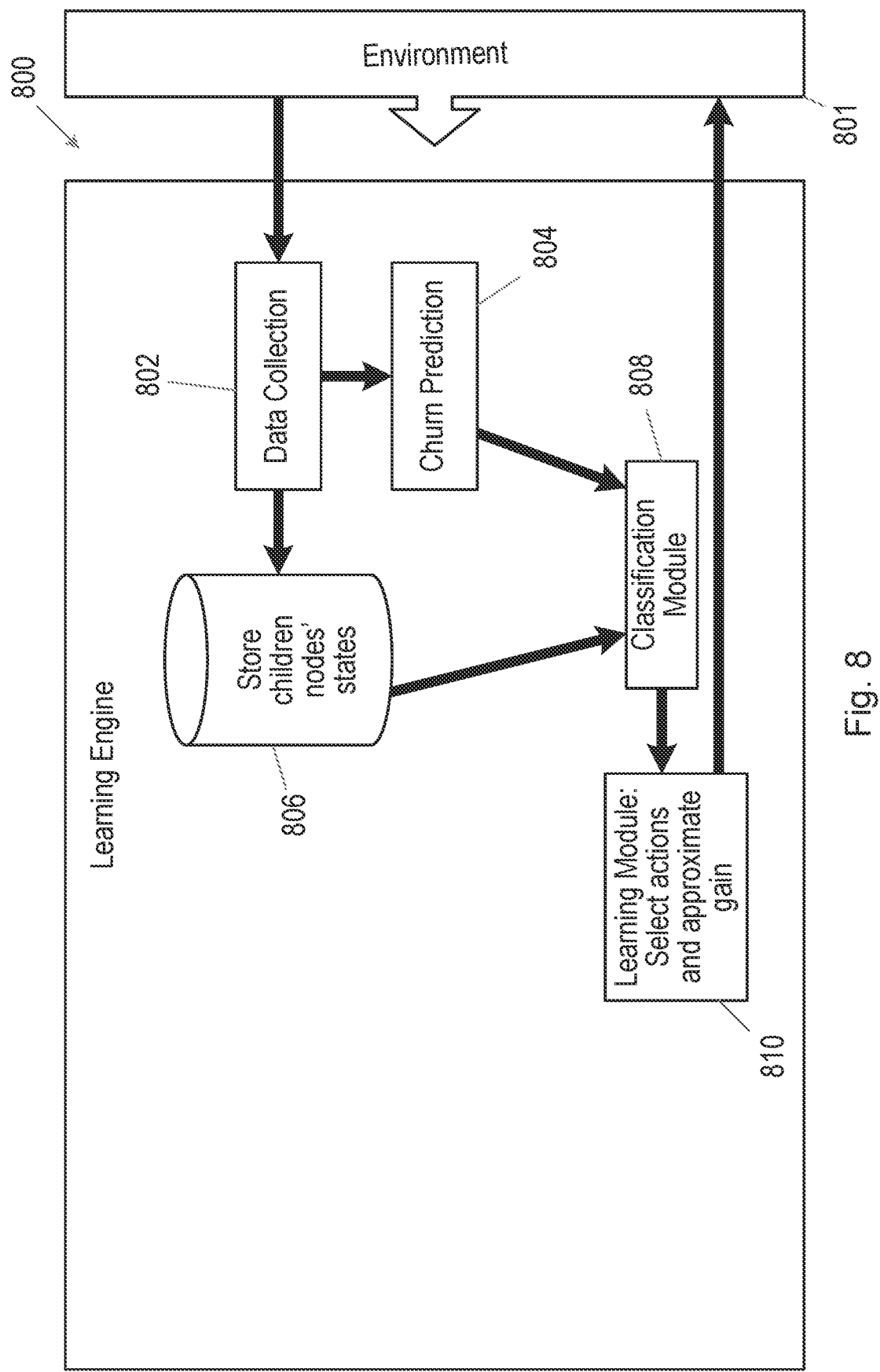
FIG. 8 illustrates functional units in an example learning engine.

FIG. 8 illustrates functional units in an example learning engine 800. Referring to FIG. 8, a Data Collection block receives data from the surrounding Environment 801 and stores nodes' states in a database 806. A Churn Prediction block 804 receives data from the Data Collection block 802 and predicts churn probability of fog nodes. Once the probability of churn for a particular node falls beyond a threshold, replacement activity is triggered. A classification module 808 identifies neighbors and assembles a candidate set of neighbors to assume the computation load of the fog node that is predicted to churn.

A Learning module block 810 selects actions and identifies gains as described above and below. The Learning Module discovers a morphism that will enable shifting of the computation load of the node predicted to churn in a manner that maximizes gain, by minimizing a loss function. The algorithm set out below illustrates how an optimal morphism may be identified. The policy corresponding to the morphism may be stored in a local database.

The algorithm below refers to the computation of gain matrices for a Churning Node (Rn) and Organizer entities ($R_o$). The gain matrix for Organizer Entities is a 3-dimensional matrix of organizer nodes and possible moves. Dimensions 1 and 2 contain the organizer node lists and dimension 3 contains the possible morphing moves (parallel, series, and subnet). This matrix is initialized with 1s and 0s, where 1 means that particular valid move is possible between two organizer nodes, and 0 means that particular move is not possible. Gain values are then calculated and changed as set out in the algorithm below. Based upon the gain matrix for Organizer Entities, the gain matrix for the Churning Node may be derived. This matrix is again a 3-dimensional matrix where dimension 1 contains only the churning node, dimension 2 contains the organizer nodes and dimension 3 contains the possible moves (parallel, series, and subnet). This matrix is initialized with 1s and 0s, where 1 means that particular valid move is possible between churning node and organizer node and 0 means that particular move is not possible. Gain values are then calculated and changed as set out in the algorithm below.

Optimizing Computation Shift and Morphing Algorithm

---

Input: initial computation graph, available fog nodes.
Output: Optimal sequence of actions required to shift and preserve the computation graph after existing fog node(s) churned out.
  1. Compute Gain matrix for Node ($R_n$) and Organizer entities ($R_o$).
  2. Gain matrix contains gains for combinations of basic morphing operations.
  3. Initialize starting Node state $S_n$ and Organizer State $S_o$.
  4. Initialize score to 0.0.
  5. for t ← 1 to max_iteration do
       i.   sample an action at random provided current state $S_n$. {Node entity starts and always plays at random.}
       ii.  if valid move exists within matrix $R_n$ then
              a. perform the move
              b. compute gain from current state and action
       iii. else
              a. gain ← 0
       iv.  end if
       v.   score ← score + gain
       vi.  sample action a at random provided current state $S_o$. {Organizer entity plays as per the learning approximation}
       vii. if a is a valid move within $R_o$ then
              a. perform move a
              b. compute gain
              c. obtain next state s'
              d. s ← s'

```
    viii.    else
                a.  gain ← 0
    ix.     end if
    x.      R_max ← gain
    xi.     score ← score + gain
    xii.    Get the actions taken in this episode.
    xiii.   end for
```

The above algorithm may run for n number of episodes until learning is done. Gain is calculated from a weighted sum of Computation loss, Latency and Data loss. These losses depend on CPU power, memory, device types, storage, job load, completion time, average uptime of each fog node etc. Maximum Gain $R_{max}$ is calculated from the total computation (weighted sum) of gain when churning (state changes) nodes are still present. Once nodes are churned out, a morphed graph aims to achieve the same $R_{max}$ using existing resources.

After the above discussed procedures, it is possible to identify how computation of a fog node may be distributed among neighboring nodes. Over a period, the algorithm can make note of all the possible ways in which computation may be distributed for all the nodes and tasks. All this information can be passed on to the learning engine, so that the algorithm can decide on the optimal way of distributed computation without needing to completely reconstruct a new computation graph but rather morphing the existing computation graph.

Example of algorithmic flow: An example of above algorithmic flow is now provided. The algorithm learns possible different combinations of fog nodes to shift the computation of a predicted churn node. For each possible combination, a corresponding gain value is calculated. The gain associated with shifting to a particular combination depends, inter alia, on the current state of computing hardware of the fog nodes under consideration.

Step 1: Consider a node as churning node and other associated nodes as organizer for shifting operation. Build their Gain Matrices as described above.

Step 2: Initialize the current states of the nodes as starting states. Here state means a node's computing state, and this state will eventually decide the computation loss, latency and data loss associated with a particular shifting operation and thus the total gain.

Step 3: Initialize a variable 'score' as zero.

Step 4: Define a max_iteration for the learning phase and run a loop for this.

Step 5: Take a random action (churning probability randomly assigned) from the current state of churning node.

Step 6: If a valid move is present in Gain Matrix of the node then perform the move, calculate the gain associated with this action. Update the 'score' variable with the gain value calculated.

Step 7: Now, based on the last action by node, perform the action in organizer nodes. Check if a valid move is present in Gain Matrix of organizers, compute the gain and move to the next state. Update the score with obtained gain.

Here 'move' means adding combinations (series, parallel, subnet of multiple organizers) in topology.

After iterating over max_iteration times, the system learns about gain calculation from different actions taken and state changes of churning node and organizers. In case a node is churned out, the system attempts to restore the computation graph with the available organizers.

Figure 9:
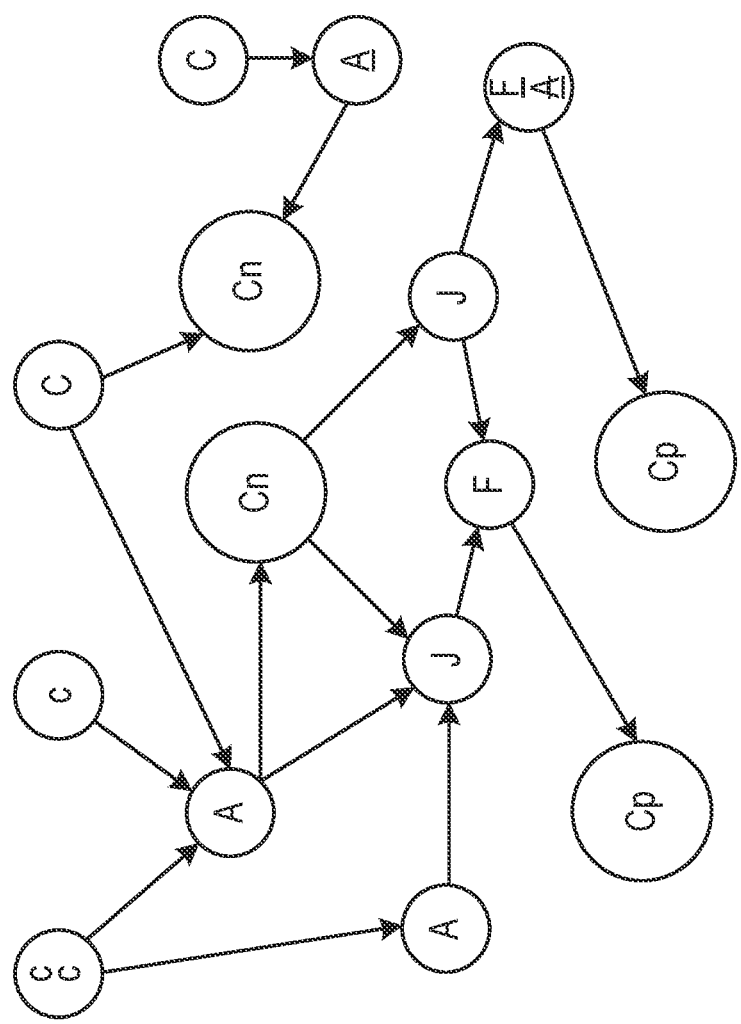
FIG. 9 illustrates another example computation graph.

A computation graph of fog nodes for real time data streaming is illustrated in FIG. 9. Computing activities involved include collection (C), aggregation (A), counting (Cn), join (J), filtering (F) and compression (Cp). Fog nodes involved in these activities are illustrated in FIG. 9 and labelled with their activity. If for example an aggregation node (A) from the computation graph of FIG. 9 is about to churn out then the associated organizers are first detected and then the best topology morphing strategy for shifting the computation of that node is discovered using the above algorithm. The best strategy provides the maximum gain in shifting the computation.

Use Case Illustrations

Synthetic Example: Example implementation of the methods described herein is now described with reference to FIGS. 10 and 11. Node 'A' is predicted to churn from the network. On the basis of geographical separation from A, ten neighbor nodes are identified, B1 to B10. The objective is then to find the combination of nodes from the neighbors to which the computation of node 'A' can be shifted. As discussed above Mutual Information is first computed between the churning fog node and other nodes.

Figure 10:
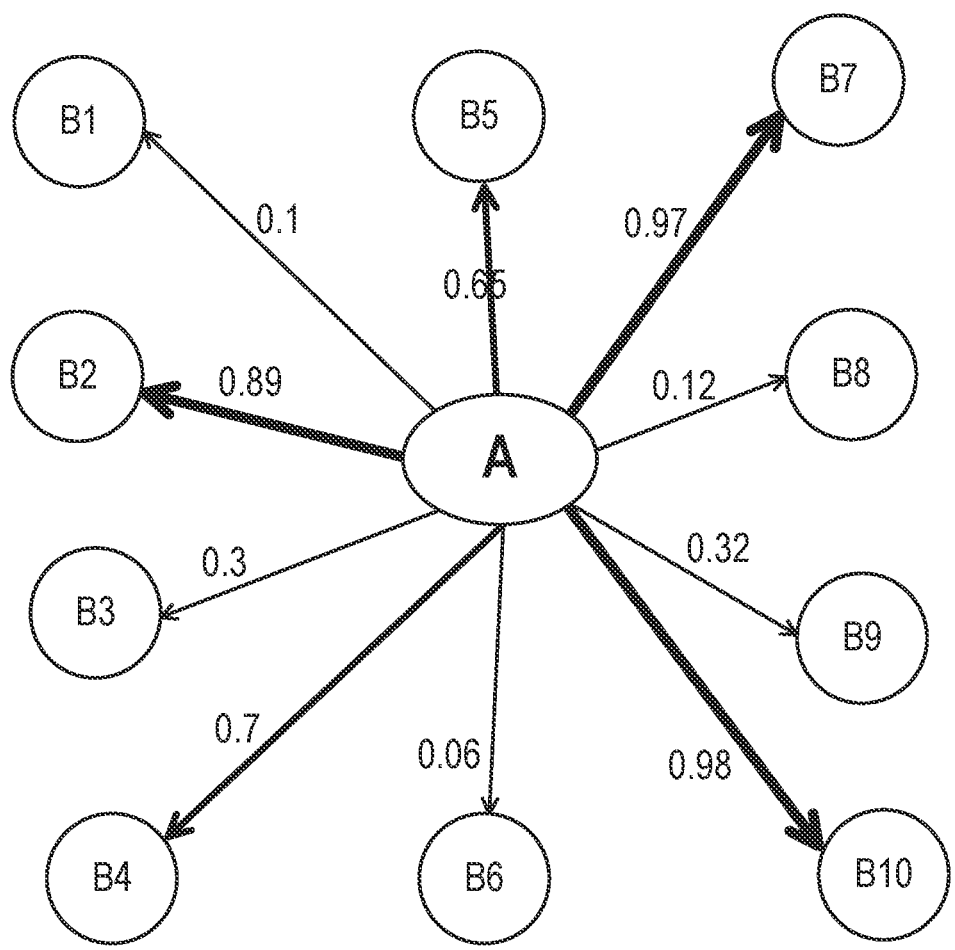
FIG. 10 illustrates neighbour nodes in a fog network.

Mutual information Computation and representation: First, the probability density function (pdf) is estimated for all the nodes. From the estimated pdf, the Mutual Information may be calculated. Mutual Information values are illustrated in FIG. 10 on the edges connected the neighbor nodes to predicted churn node A. The strength of the edges depends on the value of mutual information. For example, the edge connecting node 'A' and node 'B10' is very strong as it has high mutual information whereas the edge connecting node 'A' and node 'B6' is very weak as it has low mutual information.

Figure 11:
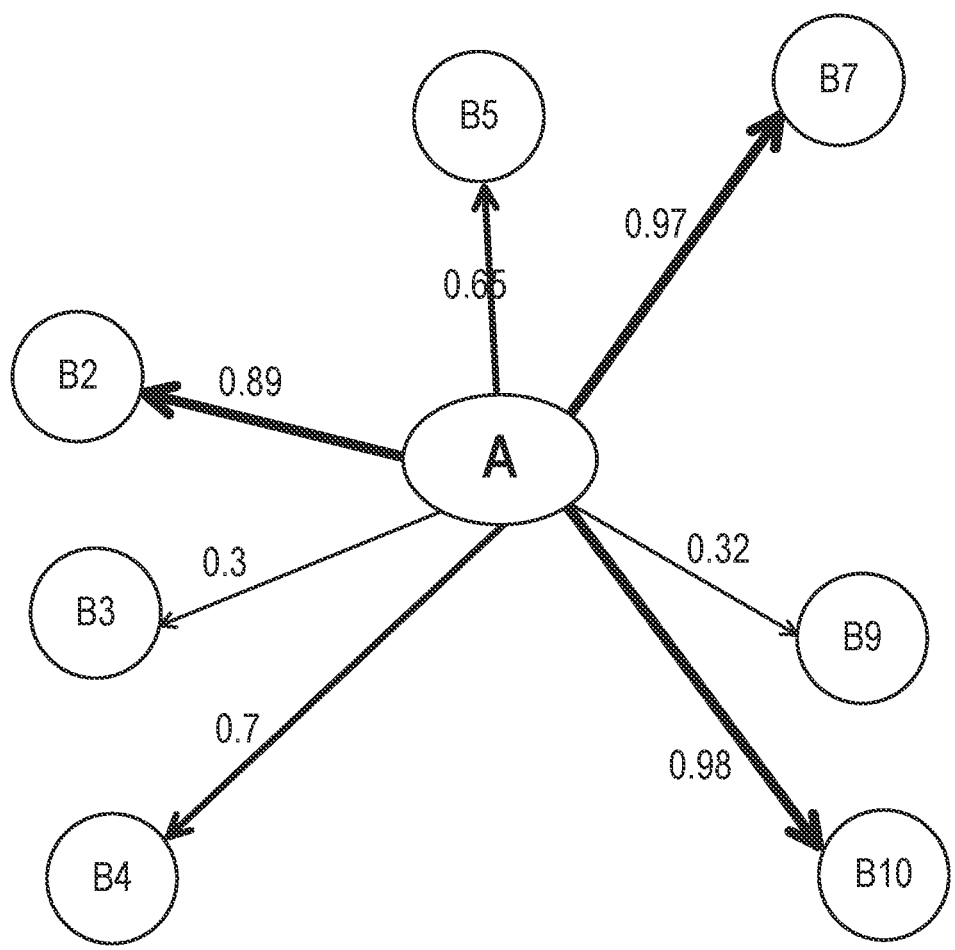
FIG. 11 illustrates neighbour nodes in a fog network after filtering.

Assembling a candidate set: In this step, neighbors to which the computation of the probable churning fog node can be shifted are added to the candidate set. A vector of all the mutual information values may be assembled and a threshold selected for membership of the candidate set. As discussed above, an example threshold may be the first quantile of the mutual information vector. For the illustrated example, the first quantile of the mutual information vector is 0.165. Hence, the nodes connected by edges whose mutual information is less than 0.165 can be discarded. The revised graph of neighbor nodes, including only the candidate set and the predicted churn node is illustrated in FIG. 11. Nodes B1, B6 and B8 have been removed as they have a value of mutual information that is less than the threshold. Other methods for defining the threshold may be envisaged, with a balancing of flexibility and computational complexity, as discussed above.

The optimal morphism for shifting the computation of the probable churning fog node is then learned. The learning engine at a parent node of the predicted churn node works as an entity where the action is defined as shifting the computation to one or more nodes/subnets selected from the neighbors of the candidate set. The gain is calculated based on computation loss, data loss and latency for each type of possible morphing operation. The engine decides an optimal policy based on the fog network graph and morphs the computation graph into an optimal sequence of basic morphing actions required to preserve the computation after the predicted churn node churns out.

In above example, with node A to be churned out, a reduced candidate set may be assembled on the basis of a higher threshold value. For example, with a threshold value=0.8, then B10, B7 and B2 are selected.

Computation loss(CL)=(no. of current processes running in churning out node−no. of processes that can be started immediately in new node).

Latency (L)=amount of time required to shift computation from churning out node to new node.

Data loss(DL)=(amount of data currently handled by running applications on churning out node*data transmission time to new node).

The total gain from Computation loss, Latency and Data loss for three basic morphing operations (length, Width and Subnet morphing) of B10, B7 and B2 nodes/subnets are calculated and best strategy to shift is chosen.

There are two entities—the organizer and the churning out node. After detecting state changes in a Fog node (for example as described in PCT/IN2017/050611), the churning out node will have different states in between current active state to final churned out state. There would be intermediate states where 75%, 50%, 25% computation can be continued in that node.

States of the organizer node are related to combinations of best associated nodes—B2, B7, B10. These states have been made limited by combinations of basic morphing actions. These three nodes or subnets would be added at the place of the churning out node. This insertion can be done by adding them individually, or two nodes in parallel, or three nodes in parallel, or combination of sequence and parallel, or making a subnet in star/delta fashion. All these options make possible state changes. Based upon the nature of computation (running processes and threads) the optimal combination is determined.

The action to be taken is to add a node or combination of nodes. The gain is the value calculated as given above. The policy is to combine and to place the nodes for maximum gain.

Once value tables are initialized, from the current state, the next combination is chosen based on action selection policy discussed above. In this way, possible combinations and gains are assessed.

| Gain Components Nodes | CL | L (millisecond) | DL (bytes * millisecond) |
|---|---|---|---|
| B2 | 5 | 900 | 5 KBs |
| B7 | 3 | 1200 | 5.2 KBs |
| B10 | 1 | 1000 | 4.9 KBs |

Morphing Combinations

| Gain Components Combinations | CL | L (millisecond) | DL (bytes * millisecond) |
|---|---|---|---|
| B2 ∥ B7 | 3 | 1100 | 5.6 KBs |
| B7 ∥ B10 | 1 | 840 | 5.2 KBs |
| B10 ∥ B2 | 1 | 900 | 5.9 KBs |
| B2-B7 sequence | 3 | 860 | 4.8 |
| B7-B10 sequence | 2 | 1080 | 5.4 |
| B10-B2 sequence | 1 | 900 | 6.1 |
| B2-B7-B10 sequence | 1 | 1150 | 6.3 |
| B2-B7-B10 subnet | 1 | 970 | 5.5 |

*CL = Computation Loss
L = Latency
DL = Data Loss

Gain for individual nodes and their basic morphing operations combinations are calculated. It can be calculated by weighted sum: $W_1*CL+W_2*L+W_3*DL$ where $W_1$, $W_2$ and $W_3$ are tunable parameters as per use cases. For the illustrated implementation, the following values are selected: W1=100, W2=0.3 and W3=50. B10 and B7 in parallel is discovered to be the combination with highest gain value (100*1+0.3*840+5.2*50=100+252+260=612: this is the lowest loss and hence the highest gain). The combination of B10 and B7 is parallel is therefore chosen for morphing the computation graph, and the computation load of the churning out node A is shifted to these nodes.

It will be appreciated that traditional Reinforcement Learning (RL) is one methodology in which a computer learns ideal behavior by feedback from environment to maximize its performance. Unlike traditional RL approach, the proposed Approximation Learning approach is not meant only for closed environment. Here, morphing operation of an uncertain, dynamic fog network environment has been made semi-closed by classifying actions into three basic morphing operations. Besides direct feedback from environment, the proposed system can approximate the gain by itself. In traditional approach it is typically necessary to use some function approximator to represent the policy. As the policy is typically not any Gaussian, the algorithm becomes an approximation. The policy representation limitation has been checked and eliminated in this proposed approach. Exploration and exploitation trade-off has been made limited.

Figure 12:
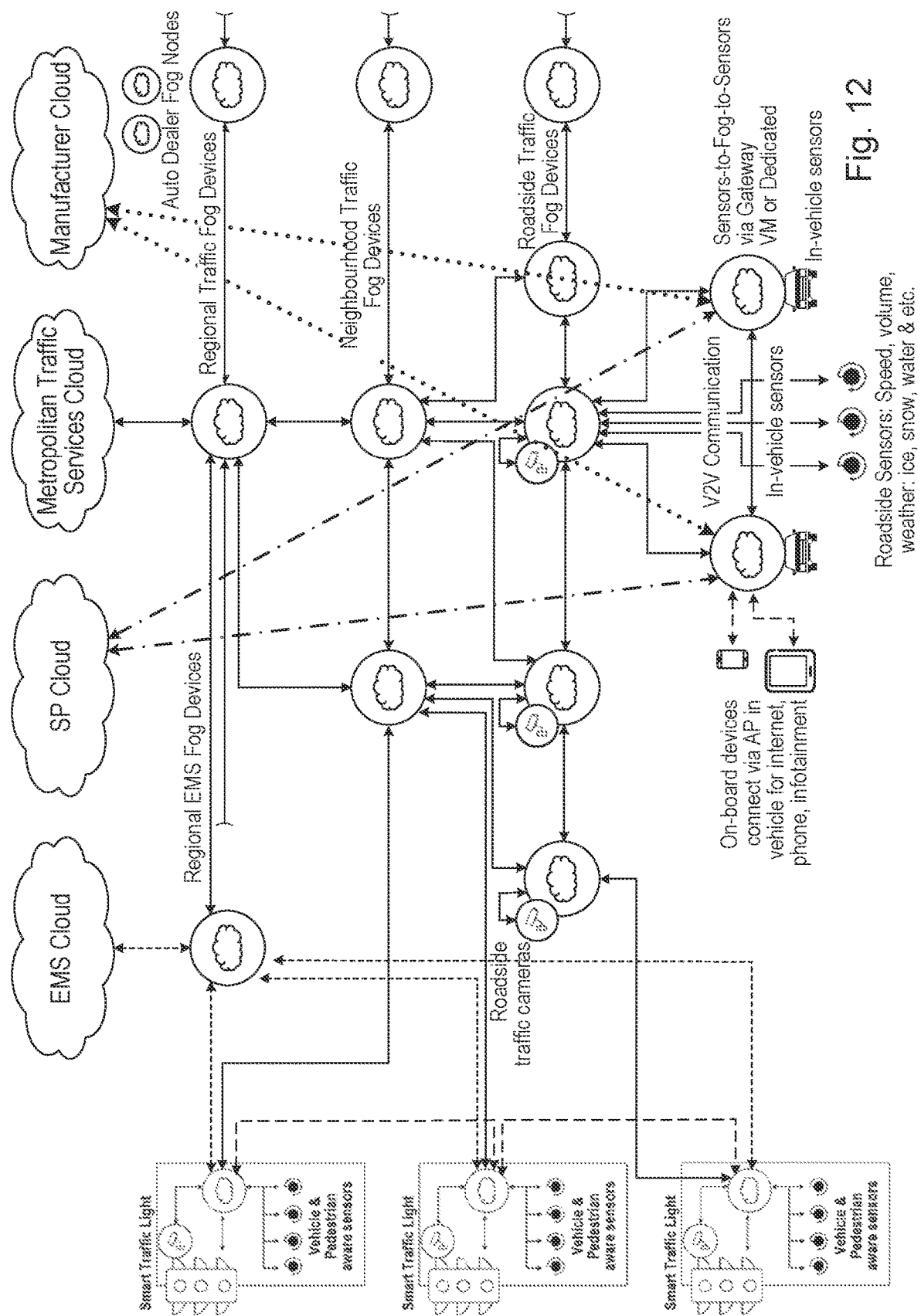
FIG. 12 is a simplified representation of the OpenFog Reference Architecture.

As discussed above, autonomous vehicles, or "connected cars" is one example use case for fog networks, and consequently a potential application for the methods described in the present disclosure. Smart autonomous cars will generate multiple terabytes of data every day from their combinations of sensors including light detection and ranging (LIDAR), global positioning systems (GPS), cameras, etc. When the smart car is coupled with intelligent infrastructure, a cloud-only model cannot support the operational requirements of a deployment. A fog computing approach, however, can offer the significant processing power with guaranteed very low latency that is required to facilitate operation of autonomous vehicles. In a connected cars scenario, each car constitutes a fog node, as well as additional roadside, neighborhood and regional devices. The present disclosure contemplates use of the OpenFog Reference Architecture (RA), as illustrated schematically in FIG. 12, although it will be appreciated that the methods of the present disclosure may be integrated with any other architecture with minimum changes. The OpenFog RA enables fog-cloud and fog-fog interfaces and offers several unique advantages over other approaches, which advantages include Security, Cognition, Agility, Latency and Efficiency (SCALE).

The computation of a complex operation in mobile fog nodes may be delegated to hierarchical nodes to leverage adjacent resources. One example task may be real time surveillance and traffic condition monitoring by road side units (RSU) and vehicles. The RSUs and vehicles collect real time video data from cameras. These fog nodes perform some local analysis for local action, such as alerting the vehicles about poor road conditions, triggering autonomous response to slow down, and performing some autonomous functions. Data from the first level of interactions is aggregated and sent up the fog hierarchy to the second and third levels of the hierarchy—neighborhood and regional fog nodes—for further analysis and distribution. Some of the data may also be distributed east-west to other infrastructure nodes for their use.

In the fog network, each node should be able to act as a router for nearby nodes and be resilient to node mobility and churn. Connected Cars in a specific city may be considered as a graph in which each connected car is represented as a node with individual capacity to process data. Each connected car can generate some information on a real-time basis which may be useful for city planning and many automation activities. In this situation, a connected car that moves beyond the city border will churn out of the fog network, so losing connectivity to the network and depriving the network of its computational capacity and stored data. Examples of the present disclosure enable the fog network, on predicting that the car is likely to churn out of the network (for example on the basis of its trajectory and/or behavior patterns), to collect relevant data from the car and transfer its computation load to other nodes in the network, which may be nearby cars or RSUs.

In the context of the methods of the present disclosure, dependencies between the mobile fog nodes change with each addition or removal of a node from the network and as fog nodes move around the network. In such a dynamic scenario, it is difficult to predict the neighbors of a probable churning fog node, and consequently storing information on a global level may be useful.

Figure 13:
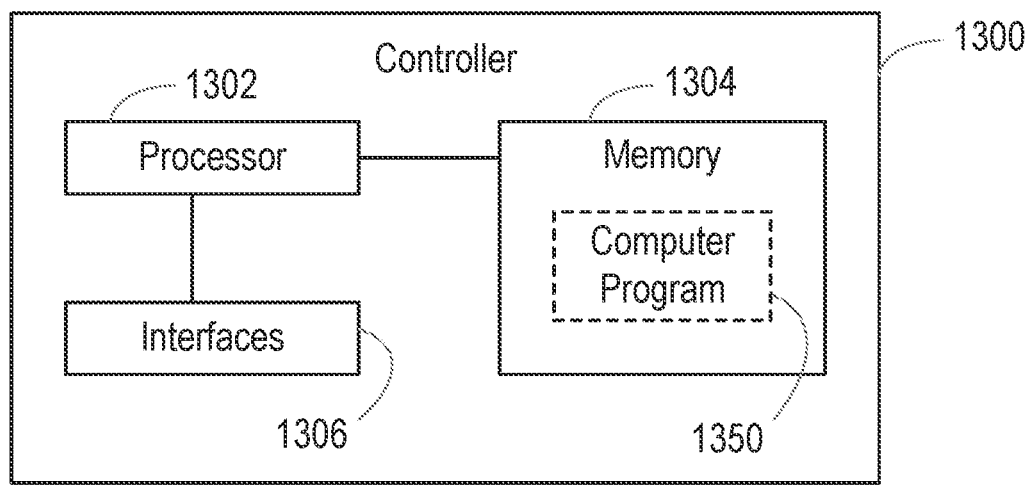
FIG. 13 is a block diagram illustrating functional units in a controller.
Figure 14:
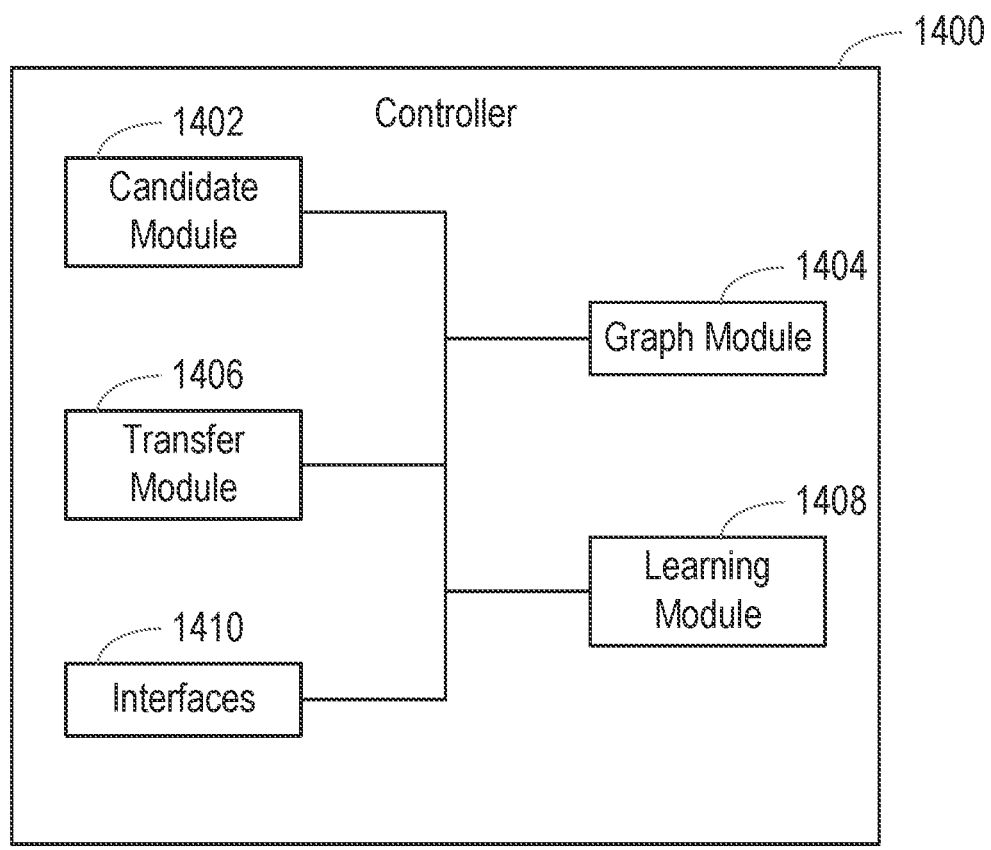
FIG. 14 is a block diagram illustrating functional units in another example of controller.

FIGS. 13 and 14 are block diagrams illustrating examples of controller 1300, 1400 which may carry out examples of the method 100 and or 200 as discussed above.

FIG. 13 illustrates a first example of controller 1300, which may implement some or all of the steps of method 100 and/or 200, for example on receipt of suitable instructions from a computer program 1350. The controller may for example be located in a fog node of a fog network. Referring to FIG. 13, the controller 1300 comprises a processor or processing circuitry 1302, a memory 1304 and interfaces 1306. The memory 1304 contains instructions executable by the processor 1302 such that the device 1300 is operative to conduct some or all of the steps of the method 100 and/or 200. The instructions may also include instructions for executing one or more telecommunications and/or data communications protocols. The instructions may be stored in the form of the computer program 1350. In some examples, the processor or processing circuitry 1302 may include one or more microprocessors or microcontrollers, as well as other digital hardware, which may include digital signal processors (DSPs), special-purpose digital logic, etc. The processor or processing circuitry 1302 may be implemented by any type of integrated circuit, such as an Application Specific Integrated Circuit (ASIC), Field Programmable Gate Array (FPGA) etc. The memory 1304 may include one or several types of memory suitable for the processor, such as read-only memory (ROM), random-access memory, cache memory, flash memory devices, optical storage devices, solid state disk, hard disk drive etc.

FIG. 14 illustrates another example of controller 1400, which may also be located in a fog node of a fog network. Referring to FIG. 14, the controller 1400 comprises a plurality of functional modules, which may execute the steps of method 100 and/or 200 on receipt of suitable instructions for example from a computer program. The functional modules of the controller 1400 may be realised in any appropriate combination of hardware and/or software. The modules may comprise one or more processors and may be integrated to any degree. Referring to FIG. 14, the controller 1400 comprises a candidate module 1402 for identifying, from among nodes of the fog network, a candidate set of nodes for computational load transfer from the fog node, wherein the candidate set is identified on the basis of Mutual Information between the fog node and other nodes of the fog network. The controller also comprises a graph module 1404 for obtaining a computation graph representing computation in the fog network, the computation graph including the fog node. The controller 1400 also comprises a learning module 1408 for using a learning model to identify a morphism from the obtained computation graph to a new computation graph, in which the fog node is not included, which morphism preserves computation of the obtained computation graph while minimising a loss function. The identified morphism comprises a sequence of one or more morphing operations that replaces the fog node in the obtained computation graph with a topology of one or more nodes selected from the candidate set. The controller 1400 also comprises a transfer module 1406 for causing computation performed at the fog node to be transferred to one or more nodes of the candidate set in accordance with the identified morphism. The controller 1400 also comprises interfaces 1410.

Aspects of the present disclosure thus provide a method and apparatus for managing the computational load of fog nodes in a fog network. Previous approaches to the management of fog networks have tended to consider every fog node as computationally independent of other nodes. However, computational task sharing among fog nodes is becoming increasingly important to increase overall system efficiency. As a consequence, if the computational capacity of any fog node becomes unavailable to the network, for example as a result of entering an inactive state or churning out of the network, this can impact many other nodes in the network. The present disclosure offers a solution in two parts: (i) Identify the nearby fog nodes which can be used as a replacement for the fog node becoming unavailable, and (ii) shift the computation of the fog node becoming unavailable to one or more fog nodes based on task assessment. Hence, once the churning or other cause of unavailability of a fog node is predicted, its computation can be shifted to one or more nodes to preserve the computation graph of the network. It is proposed to use three principle technologies: Mutual information, computation graph and approximation learning, to achieve the above steps. An Approximation Learning Engine constructs the optimal topology of a morphed graph computation graph so that computation can be preserved if some nodes become unavailable, for example by churning out of the network.

Examples of the present disclosure commence by understanding the number nodes connected to the fog node under consideration, and then determining the correlation between the nodes using Mutual Information. Neighbours may first be filtered by geographic separation and then a candidate set assembled based on Mutual Information. A computation graph may then be formed including the nodes of the candidate set, that is the nodes most closely correlated with the fog node under consideration. Examples of the present disclosure then seek to preserve the computation graph using nodes of the candidate set through multiple morphing operations with the application of a learning methodology, sharing the computation tasks of the fog node under consideration among suitable nodes from the candidate set. Morphing operation of an uncertain, dynamic fog network environment may be made semi-closed by classifying actions into three basic morphing operations. A gain or loss function may be used to assess the efficiency of different morphing operations on the basis of the capabilities and other features of the candidate nodes. Besides direct feedback from the environment, the proposed system can approximate the gain by itself. Shifting computation of the fog node under consideration in accordance with the discovered optimal sequence of morphing operations enables the operation of the fog network to continue undisturbed when the fog node under consideration becomes unavailable to the network, for example by churning out of the network.

Examples of the present disclosure thus enable the identification of an optimal topology of closely correlated and capable fog nodes from identified morphed topologies using approximation to share the computation jobs of churning fog node. Hence the environment is not disturbed due to non-availability of a fog node.

Examples of the present disclosure are based on unsupervised learning methods, and so offer the advantage of automation in assigning optimal gain for selecting the best nodes for computation load shifting. In addition, the methods of the present disclosure are adaptable to any new auto-shifting tasks and may be implemented in any new scenarios of the applications of smart city development or other fog networking applications. The new approximation procedure used in methods according to the present disclosure performs learning with a fast training phase producing steady improvement and precise learning in dynamic and uncertain environments.

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form.

It should be noted that the above-mentioned examples illustrate rather than limit the disclosure, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method for managing computation load of a fog node belonging to a fog network, wherein a computation capacity of the fog node is predicted to become unavailable to the fog network, the method comprising:
  identifying, from among nodes of the fog network, a candidate set of nodes for computational load transfer from the fog node, wherein the candidate set is identified on the basis of mutual information between the fog node and other nodes of the fog network;
  obtaining a computation graph representing computation in the fog network, the computation graph including the fog node;
  using a learning model to identify a morphism from the obtained computation graph to a new computation graph representing new computation in the fog network, in which the fog node is not included,
    wherein using the learning model comprises determining loss functions for new computations represented by new computation graphs associated with candidate morphisms, the candidate morphisms including the identified morphism,
    wherein the identified morphism preserves the computation represented by the obtained computation graph while minimising an associated loss function for the new computation represented by the new computation graph, and
    wherein the identified morphism comprises a sequence of a plurality of morphing operations that replaces the fog node in the obtained computation graph with a topology of one or more nodes selected from the candidate set, wherein the morphing operations may be performed sequentially or in parallel; and
  causing computation performed at the fog node to be transferred to one or more nodes of the candidate set in accordance with the identified morphism.

2. The method as claimed in claim 1, wherein identifying a candidate set of nodes for computational load transfer from the fog node comprises:
  calculating the mutual information between the fog node and other nodes of the fog network; and
  adding to the candidate set any nodes having a mutual information value with the fog node that is above a threshold level.

3. The method as claimed in claim 2, further comprising:
  filtering nodes in the fog network according to their geographical separation from the fog node before calculating the mutual information.

4. The method as claimed in claim 1, wherein the mutual information between the fog node and other nodes of the fog network is calculated to via a formula:

$$I(X;Y) = \sum_{\{x,y\}} P_{XY}(x,y) \log P_{XY}(x,y)$$

where:
X and Y are two discrete variables,
X corresponds to probability density function of the fog node,
Y corresponds to probability density function of another fog node,
I(X;Y) denotes the mutual information,
$P_{XY}(x,y)$ is joint probability distribution of the fog node and another node in the fog network.

5. The method as claimed in claim 1, wherein the computation graph comprises the fog node and nodes from the candidate set.

6. The method as claimed in claim 1, wherein obtaining a computation graph representing computation in the fog network comprises at least one of:
  generating the computation graph representing computation in the fog network, or retrieving the computation graph representing computation in the fog network from a memory.

7. The method as claimed in claim 1, wherein using a learning model to identify a morphism from the obtained computation graph to a new computation graph, in which the fog node is not included, which morphism preserves computation of the obtained computation graph while minimising a loss function, comprises:
  initiating the model to a current state of the fog network;
  sampling actions from a subset of possible actions in the current state;
  for sampled actions, computing a loss function, and
  selecting from the sampled actions a sequence of actions that results in the new computation graph which preserves the computation actions of the fog node while minimising the loss function.

8. The method as claimed in claim 7, wherein an action comprises a morphing operation using one or more nodes from the candidate set.

9. The method as claimed in claim 8, wherein an action comprises a morphing operation selected from the group comprising length morphing, width morphing and subnet morphing.

10. The method as claimed in claim 1, wherein a morphism which preserves computation of the obtained computation graph comprises a morphism following which all computations performed in the fog node are transferred to other nodes capable of performing the computations and having sufficient capacity to do so.

11. The method as claimed in claim 1, wherein the loss function comprises a function of at least one of computation loss, latency and data loss, and wherein, for a morphing operation using a node from the candidate set:
  computation loss comprises a number of processes running in the fog node minus a number of processes that can be immediately started in the node from the candidate set;
  latency comprises an amount of time required to shift computation from the fog node to the node from the candidate set; and
  data loss comprises an amount of data currently handled by applications running on the fog node multiplied by a data transmission time to the node of the candidate set.

12. The method as claimed in claim 1, further comprising:
  monitoring a state of nodes in the fog network; and
  identifying the fog node as a fog node the computation capacity of which is predicted to become unavailable to the fog network.

13. A computer program stored on a non-transitory computer readable media, the computer program comprising instructions which, when executed on at least one processor, cause the at least one processor to carry out a method according to claim 1.

14. The computer program according to claim 13, wherein the computer program is contained on a carrier, wherein the carrier is the non-transitory computer readable medium.

15. A computer program product comprising the non-transitory computer readable media having stored thereon the computer program according to claim 13.

16. The method as claimed in claim 1, wherein the mutual information is related to joint probability distribution of discrete variables corresponding to probability density function of the fog node and other nodes of the fog network.

17. A controller for managing computation load of a fog nod belonging to a fog network, wherein a computation capacity of the fog node is predicted to become unavailable to the fog network, the controller comprising a processor and a memory, the memory containing instructions executable by the processor such that the controller is operable to perform:
  identifying, from among nodes of the fog network, a candidate set of nodes for computational load transfer from the fog node, wherein the candidate set is identified on the basis of mutual information between the fog node and other nodes of the fog network;
  obtaining a computation graph representing computation in the fog network, the computation graph including the fog node;
  using a learning model to identify a morphism from the obtained computation graph to a new computation graph representing new computation in the fog network, in which the fog node is not included,
    wherein using the learning model comprises determining loss functions for new computations represented by new computation graphs associated with candidate morphisms, the candidate morphisms including the identified morphism,
    wherein the identified morphism preserves the computation represented by the obtained computation graph while minimising an associated loss function for the new computation represented by the new computation graph, and
    wherein the identified morphism comprises a sequence of a plurality of morphing operations that replaces the fog node in the obtained computation graph with a topology of one or more nodes selected from the candidate set, wherein the morphing operations may be performed sequentially or in parallel; and
  causing computation performed at the fog node to be transferred to one or more nodes of the candidate set in accordance with the identified morphism.

18. The controller as claimed in claim 17, wherein the identify a candidate set of nodes for computational load transfer from the fog node comprises:
  calculating the mutual information between the fog node and other nodes of the fog network; and
  adding to the candidate set any nodes having a mutual information value with the fog node that is above a threshold level.

19. The controller as claimed in claim 18, wherein the memory contains instructions executable by the processor whereby the controller is further operative to:
  filter nodes in the fog network according to their geographical separation from the fog node before calculating the mutual information.

20. The controller as claimed in claim 17, wherein the mutual information between the fog node and other nodes of the fog network is calculated via a formula:

$$I(X;Y) = \sum_{\{x,y\}} P_{XY}(x,y) \log P_{XY}(x,y)$$

where:
X and Y are two discrete variables,
X corresponds to probability density function of the fog node,
Y corresponds to probability density function of another fog node,
I(X;Y) denotes the mutual information,
$P_{XY}(x,y)$ is joint probability distribution of the fog node and another node in the fog network.

21. The controller as claimed in claim 17, wherein the memory contains instructions executable by the processor whereby the controller is further operative to:
  monitor a state of nodes in the fog network; and
  identify the fog node as a fog node the computation capacity of which is predicted to become unavailable to the fog network.

22. The controller as claimed in claim 17, wherein the mutual information is related to joint probability distribution of discrete variables corresponding to probability density function of the fog node and other nodes of the fog network.

* * * * *